United States Patent [19]

Cogbill et al.

[11] Patent Number: 4,850,750

[45] **Date of Patent: * Jul. 25, 1989**

[54] INTEGRATED BLENDING CONTROL SYSTEM

[75] Inventors: Randall B. Cogbill; Timothy J. Dodd; Paul W. Heilman; Daryl L. Heronemus; Leslie R. Sears; Leslie N. Berryman; Robert L. Baker; Larry E. Guffee; David A. Prucha; Don M. Roberts; Elbert L. Shackelford; Calvin L. Stegemoeller; Lonnie R. Walker, all of Duncan, Okla.

[73] Assignee: Halliburton Company, Duncan, Okla.

[ * ] Notice: The portion of the term of this patent subsequent to Dec. 29, 2004 has been disclaimed.

[21] Appl. No.: 98,602

[22] Filed: Sep. 16, 1987

Related U.S. Application Data

[62] Division of Ser. No. 757,032, Jul. 19, 1985, abandoned.

[51] Int. Cl.[4] .............................................. B65G 53/44

[52] U.S. Cl. ........................................ 406/82; 406/39; 406/156; 114/72; 414/300

[58] Field of Search ....................... 406/51, 71, 82, 38, 406/39–44, 10, 28, 119, 120, 154, 156; 198/530, 532, 534, 524; 414/289, 293, 300, 332; 114/72; 366/19, 27, 33, 37, 177, 132, 10, 29, 43, 49

[56] References Cited

U.S. PATENT DOCUMENTS

| | | | |
|---|---|---|---|
| 3,172,175 | 3/1965 | Hartley | 22/89 |
| 3,195,634 | 7/1965 | Hill | 166/42 |
| 3,362,585 | 1/1968 | Nessim et al. | 198/530 X |
| 3,456,720 | 7/1969 | Brewer | 166/0.5 |
| 3,606,036 | 9/1971 | Beebe et al. | 214/14 |
| 3,625,724 | 12/1971 | Alvero | 106/87 |
| 3,664,422 | 5/1972 | Bullen | 166/283 |
| 3,670,923 | 6/1972 | Hawes, Jr. et al. | 222/2 |
| 3,902,553 | 9/1975 | Jergins | 166/0.5 |
| 3,980,136 | 9/1976 | Plummer et al. | 166/280 |
| 4,265,266 | 5/1981 | Kierbow et al. | 137/101.19 |
| 4,353,482 | 10/1982 | Tomlinson et al. | 222/1 |
| 4,372,751 | 2/1983 | Chapman et al. | 406/39 X |
| 4,410,106 | 10/1983 | Kierbow et al. | 222/135 |
| 4,427,133 | 1/1984 | Kierbow et al. | 222/77 |
| 4,440,653 | 4/1984 | Briscoe et al. | 252/8.55 R |
| 4,453,596 | 6/1984 | Conway et al. | 166/278 |
| 4,498,783 | 2/1985 | Rudolph | 366/132 |
| 4,502,551 | 3/1985 | Rule et al. | 175/6 |
| 4,538,221 | 8/1985 | Crain et al. | 364/172 |
| 4,538,222 | 8/1985 | Crain et al. | 364/172 |
| 4,579,458 | 4/1986 | Ohlson | 366/8 |
| 4,627,495 | 12/1986 | Harris et al. | 166/280 |
| 4,701,095 | 10/1987 | Berryman et al. | 414/289 X |
| 4,715,721 | 12/1987 | Walker et al. | 114/72 X |

FOREIGN PATENT DOCUMENTS

| | | | |
|---|---|---|---|
| 718147 | 11/1954 | United Kingdom | 198/575 |

*Primary Examiner*—Joseph F. Peters, Jr.
*Assistant Examiner*—James M. Kannofsky
*Attorney, Agent, or Firm*—James R. Duzan; E. Harrison Gilbert, III

[57] ABSTRACT

An integrated control system, specifically transportable on water between offshore wells, includes mixing and blending subsystems, a pumping subsystem, a proppant subsystem and a control subsystem for controlling the other subsystems in a unified manner from a common control location.

5 Claims, 18 Drawing Sheets

30
CLAM
CLAM
METHANOL FIG. 4D
ACID FIG 4E
RHE FIG. 4I
RHEOLOGY
LGC HOLDING TANK
LGC FIG 4A
LA #11 FIG. 4F
SEAWATER - FIG. 4B

INTEGRATED BLENDING CONTROL SYSTEM

This is a divisional of co-pending application Ser. No. 757,032 filed on July 19, 1985 now abandoned.

BACKGROUND OF THE INVENTION

This invention relates generally to integrated control systems for producing a blend of substances and more particularly, but not by way of limitation, to control systems, having an automated proppant delivery system, for producing fracturing fluids.

In the oil and gas industry, it is well known that in creating an oil or gas well various fluids or flowable blends need to be prepared for pumping downhole to accomplish different, known purposes. In hydraulically fracturing a selected formation within a well, a fracturing fluid, comprising a selectable combination of substances or materials, needs to be produced and pumped downhole. For example, a liquid gel concentrate might be mixed with selectable ones of several known additives to produce a mixture which is then blended with sand or other particulate material, referred to as a proppant, to produce the fracturing blend which is to be pumped downhole. Such a blend is prepared at the well site, which requires storage facilities for storing the substances to be mixed and blended, equipment for mixing and blending the substances, and equipment for pumping the resultant blend into the well.

The need for such fluids and the equipment for producing and pumping such fluids has been recognized and has, to some degree, been met by individual pieces of equipment which are separately transported to a common site and separately controlled for use collectively in producing and pumping the blend. Mixing and blending equipment are described in U.S. Pat. Application Ser. No. 483,001, Apparatus and Method for Mixing a Plurality of Substances, filed Apr. 6, 1983, now U.S. Pat. No. 4,538,221, and in U.S. Pat. Application Ser. No. 483,031, Apparatus and Method for Mixing a Plurality of Substances, filed Apr. 6, 1983 now U.S. Pat. No. 4,538,222. A proppant conveying system is described in U.S. Pat. No. 4,701,095. These patents and applications, which have been assigned to the assignee of the present invention, disclose equipment which has been in public use for more than one year. These patents and applications are incorporated herein by reference both for the background and prior art disclosures made therein of pertinence to the present invention and for the disclosure of equipment exemplifying the type of individual elements which can be adapted for use in the present invention.

One shortcoming of the aforementioned prior art is that many separate pieces of equipment must be separately transported and assembled together for each fracturing, or other type of fluid preparation and pumping, job. This requires maintaining logs of the individual pieces of equipment to insure that suitable ones will be available when needed. This also requires repeated assembly and disassembly of the separate elements from job to job. Still another shortcoming is that the separate pieces of equipment are separately controlled, often with much manual labor involved in the load manipulation of valves and couplings. Therefore, there is the need for an integrated system in which all necessary materials or substances can be stored, mixed, blended and pumped without the need to individually collect, assemble and disassemble separate pieces of equipment for each fluid producing and pumping job. There is also the need for such an integrated system to be controlled in a uniform or integrated fashion to insure the preparation of a proper blend and to reduce the amount of direct manual labor involved in the manipulation of the equipment. These needs contemplate that the original construction of the overall system is to include a single transportation vehicle so that all of the equipment of the system can be fixed to the vehicle and simultaneously transported by it.

The foregoing needs have become particularly critical for offshore drilling operations where it may be even more inefficient and hazardous to try to assemble on the offshore drilling platform, or to provide with a number of floating vessels, the type of storage, conveying and metering system, with the previously required personal involvement with the equipment, necessary to properly produce and pump a blend into an offshore well. Therefore, there is the particular need for an ocean-going integrated system for controlling the production of a fluid, such as a fracturing fluid.

The need for an integrated control system provides for coordinated control of the overall production and pumping activities and further facilitates remote, automated control of servomechanisms utilized throughout the system in controlling the mixing, blending and pumping of the blended substances. Such integrated control also permits system control from a single location.

SUMMARY OF THE INVENTION

The present invention overcomes the above-noted and other shortcomings of the prior art by providing a novel and improved integrated blending control system. This system provides coordinated control of the mixing, blending and pumping operations from a single location. Such remote control reduces the need for personnel to be distributed throughout the actual equipment to manually operate the equipment. The present invention permits increased and improved automation of the mixing, blending and pumping activities to insure proper compositions of the ultimate blend pumped into a well.

Broadly, the integrated control system of the present invention comprises transport means for transporting the system; mixing subsystem means, mounted on the transport means, for storing a plurality of fluids and for mixing selectable ones of the fluids to produce a mixture; proppant subsystem means, mounted on the transport means, for storing particulate material and for transferring the particulate material; blender subsystem means, mounted on the transport means, for producing a blend of the mixture and the particulate material; and a control station defined on the transport means, including: mixing control means for selectably controlling the mixing subsystem means; and proppant control means for selectably controlling the proppant subsystem means. The integrated system further comprises pumping subsystem means, mounted on the transport means, for pumping the blend from the blender subsystem means.

A particularly improved portion of the present invention is the proppant subsystem means and proppant control means. The proppant subsystem means includes storage bin means for storing particulate material; surge bin means for receiving a flow of the particulate material from the storage bin means; first conveyor means for providing the flow of particulate material to the surge bin means from the storage bin means; and second conveyor means for transferring a controllable quantity of the particulate material from the surge bin means. The proppant control means includes first speed control means for remotely controlling the speed of the first conveyor means, and second speed control means for remotely controlling the speed of the second conveyor means.

In a specific embodiment the present invention provides a method of producing a fracturing fluid for use in an offshore well, comprising the steps of:

(a) storing liquid gel concentrate on a ship;
(b) storing liquid additives on the ship;
(c) storing methanol on the ship;
(d) storing acid on the ship;
(e) storing liquid nitrogen on the ship;
(f) storing proppant on the ship;
(g) mixing, on the ship, the liquid gel concentrate and controllable amounts of the liquid additives to produce a mixture;
(h) blending, on the ship, a controllable amount of the proppant with the mixture to produce a blend;
(i) adding a controllable amount of the methanol to the blend;
(j) adding a controllable amount of the acid to the blend;
(k) adding controllable amounts of liquid additives to the composition including the blend and any methanol and acid added in steps (i) and (j) to define a fracturing composition;
(l) pumping the fracturing composition from the ship into the offshore well;
(m) vaporizing the liquid nitrogen; and
(n) adding the vaporized liquid nitrogen to the pumped fracturing composition to define the fracturing fluid used in the offshore well.

Therefore, from the foregoing, it is a general object of the present invention to provide a novel and improved integrated blending control system. Other and further objects, features and advantages of the present invention will be readily apparent to those skilled in the art when the following description of the preferred embodiment is read in conjunction with the accompanying drawings.

DETAILED DESCRIPTION OF THE PREFERRED EMBODIMENT

Figure 1:
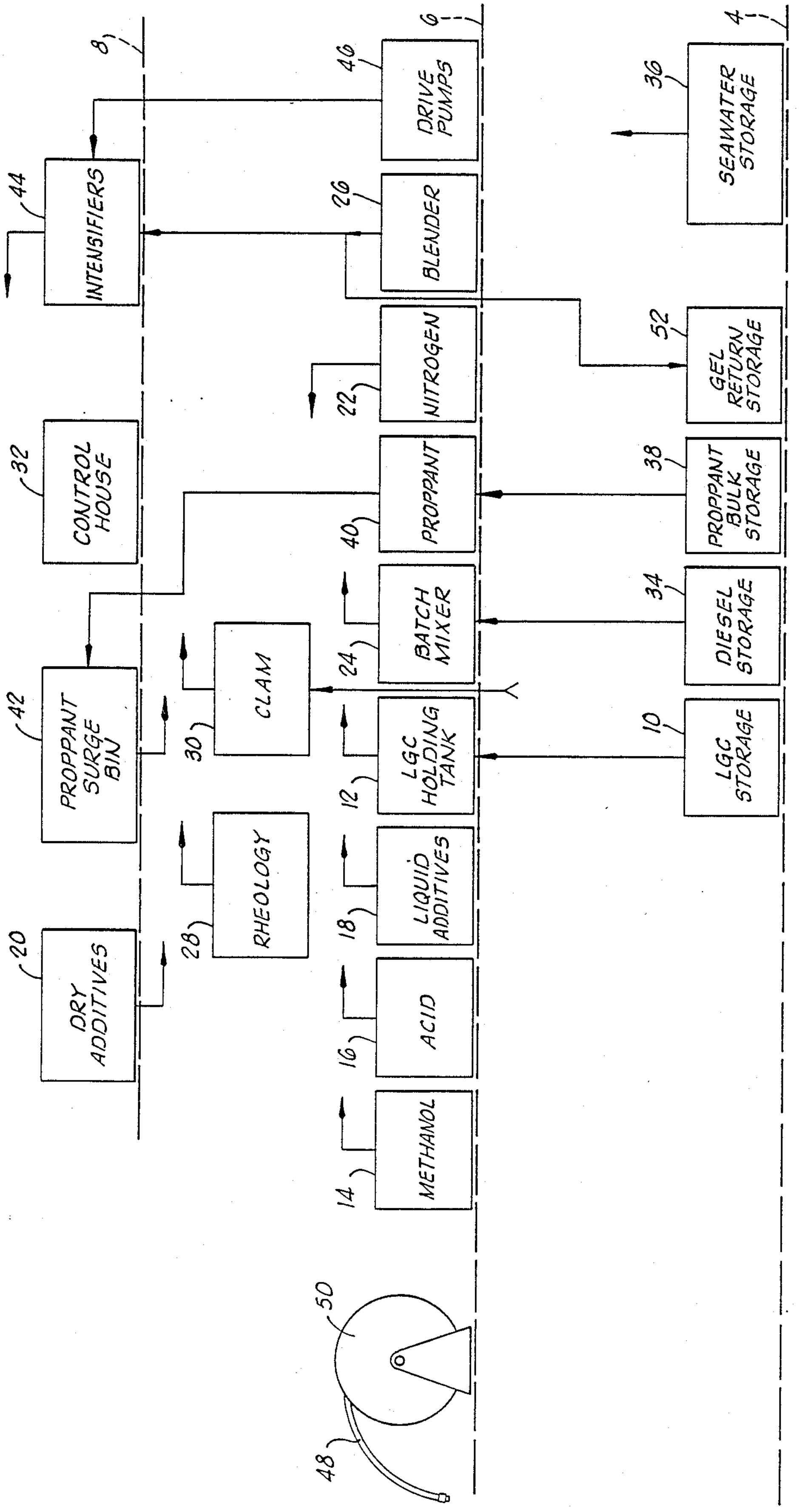
FIG. 1 is a schematic and functional block diagram of the preferred embodiment of the present invention.
Figure 2:
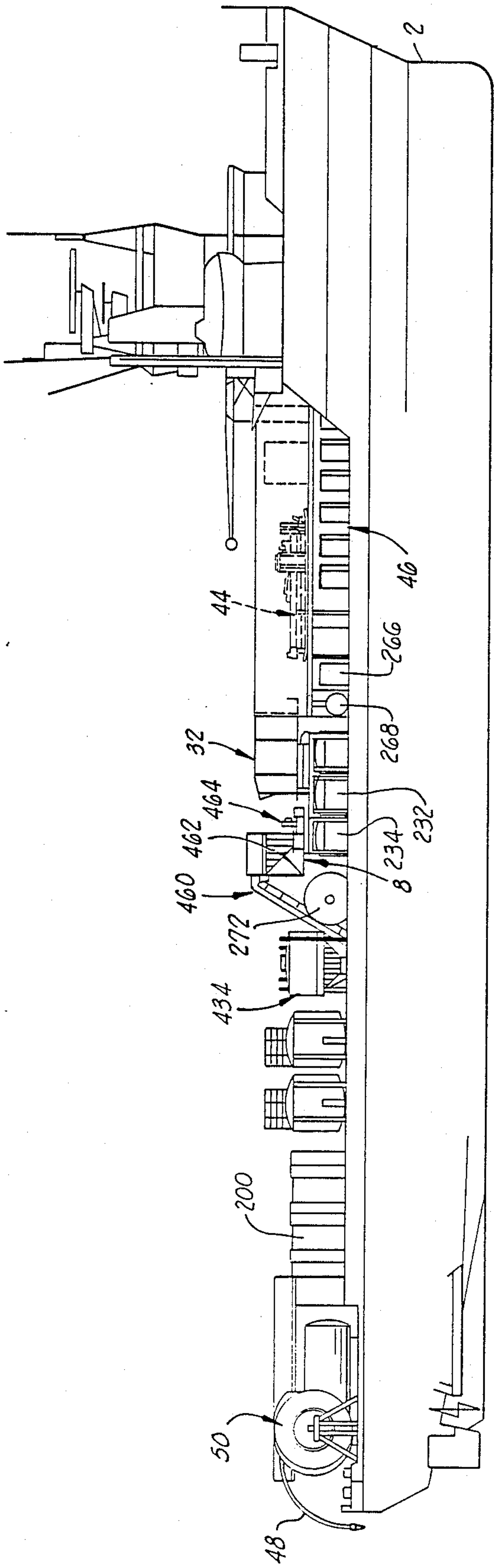
FIG. 2 is a partially schematic elevational view of a ship containing equipment controlled by the preferred embodiment of the present invention.
Figure 3:
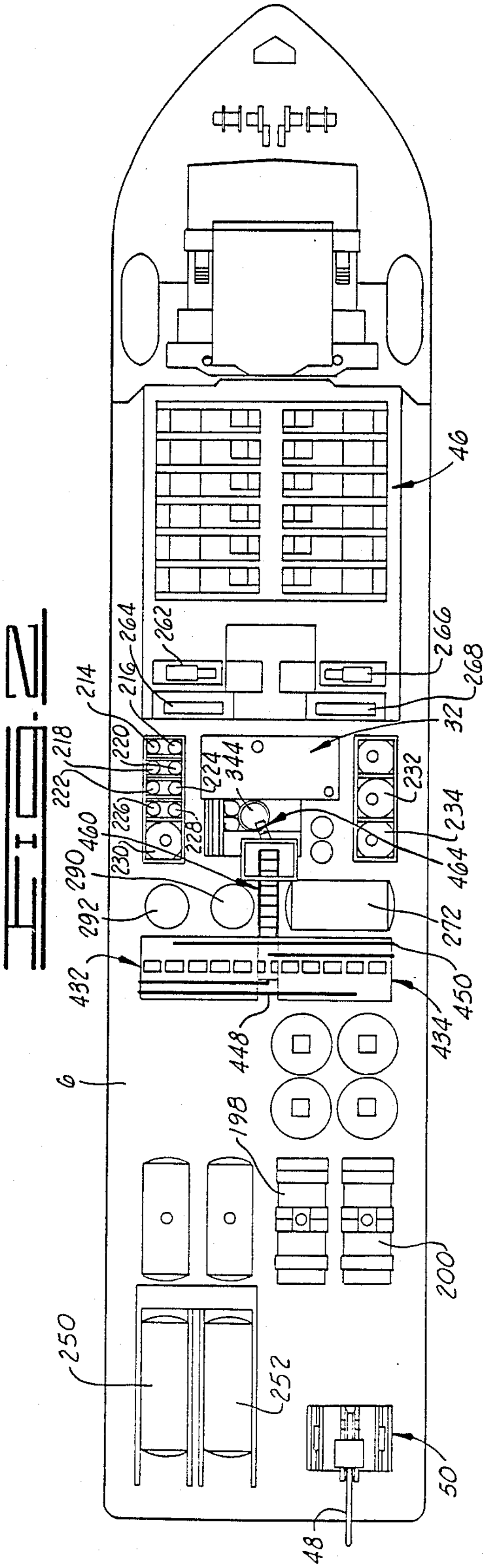
FIG. 3 is a partially schematic plan view of one tier of the equipment as shown in FIG. 2.

The preferred embodiment of the present invention is shown in FIGS. 1–3 as including a transport means specifically represented as a ship 2 having three tiers or decks 4, 6, 8 depicted by the dashed lines in FIG. 1. The ship 2 has a mixing subsystem means mounted thereon for storing a plurality of fluids and for mixing selectable ones of the fluids to produce a mixture. FIG. 1 shows the mixing subsystem means includes a liquid gel concentrate (LGC) storage circuit 10 mounted on the lowermost deck 4. The liquid gel concentrate storage circuit 10 communicates with a liquid gel concentrate holding tank circuit 12. Also included within the mixing subsystem means of the preferred embodiment are a methanol circuit 14, an acid circuit 16, a liquid additives circuit 18, a dry additives circuit 20, and a liquid nitrogen circuit 22. Many of the substances stored in these circuits are provided to a batch mixer circuit 24 which provides an output for use in a blender subsystem means having a blender circuit 26. The base fluid, comprising the liquid gel concentrate in the preferred embodiment, and the additives can also be provided to the blender circuit 26 through a rheology circuit 28 and a continuous level additive mixing (CLAM) circuit 30, which circuits 28, 30 are also included as part of the mixing subsystem means. A mixing control means located in a control house 32 forms still another part of the mixing subsystem means. The mixing subsystem means also includes diesel and seawater storage circuits 34, 36. These elements of the mixing subsystem means will be more particularly described hereinbelow with reference to FIGS. 2, 3, 4A–4H, 4L, 5 and 7.

Figure 4A:
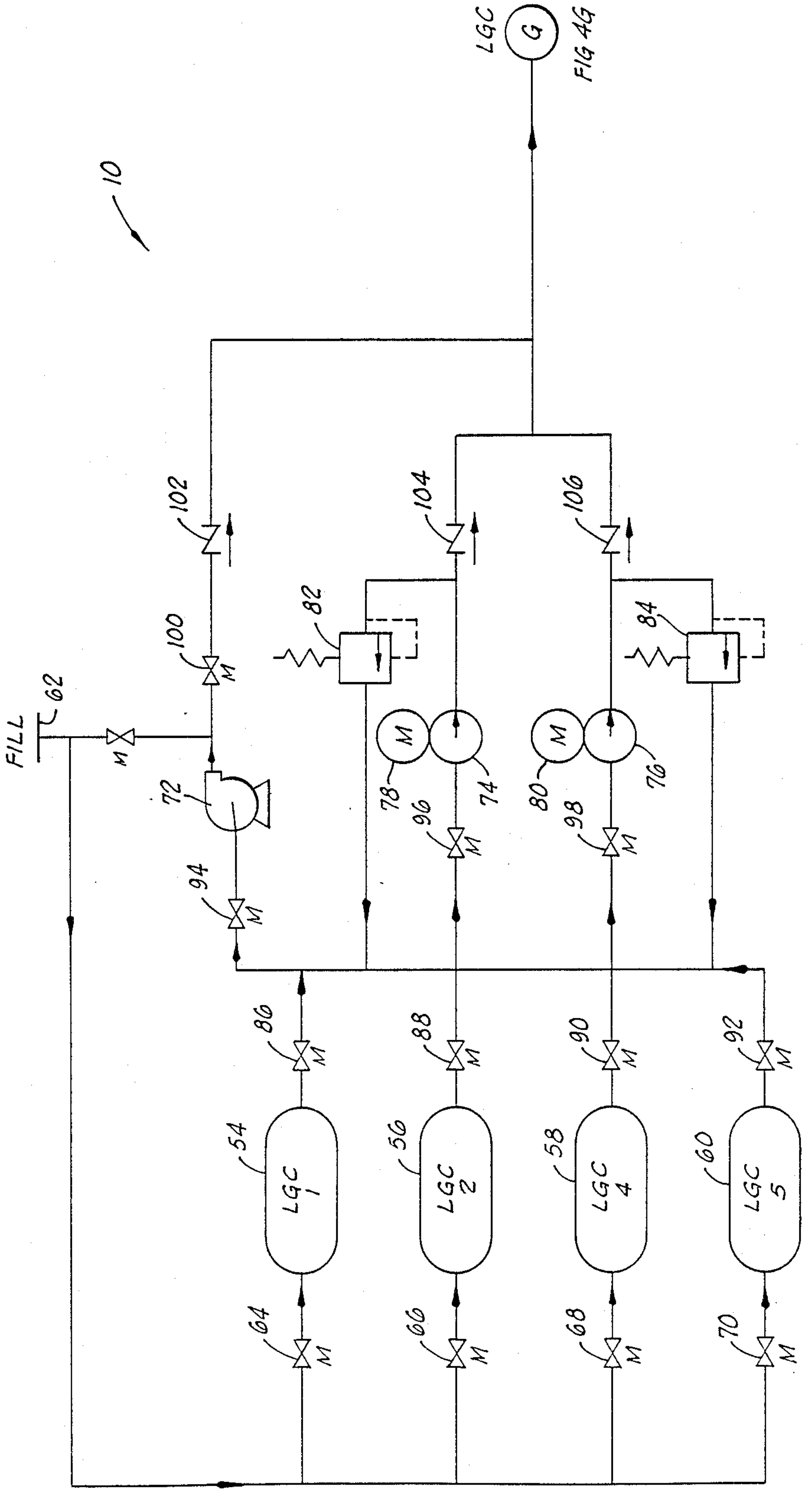
FIGS. 4A–4L disclose a schematic fluid-flow circuit diagram of mixing subsystem means, blender subsystem means, and pumping subsystem means of the preferred embodiment of the present invention.
Figure 4B:
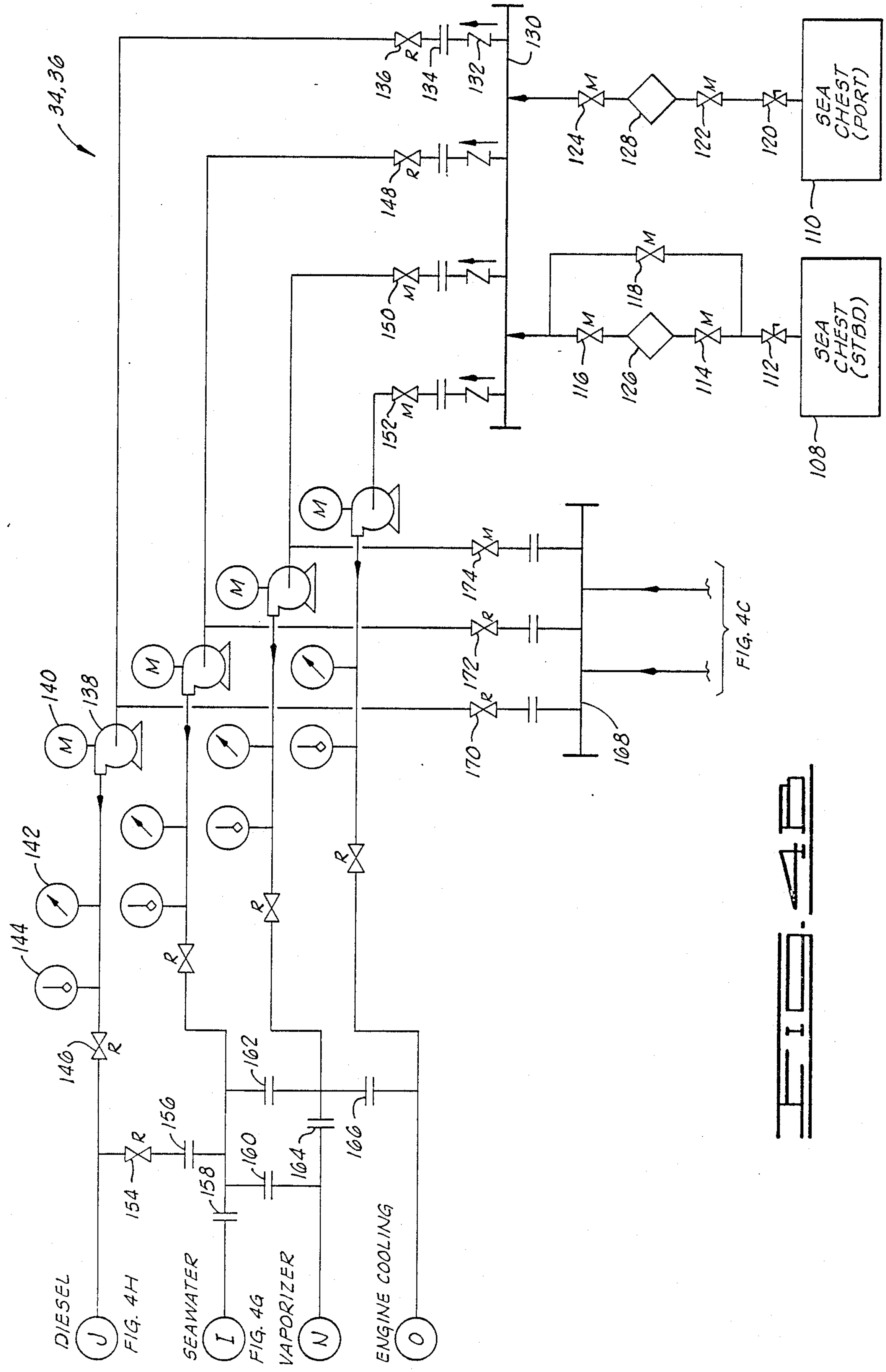
Figure 4C:
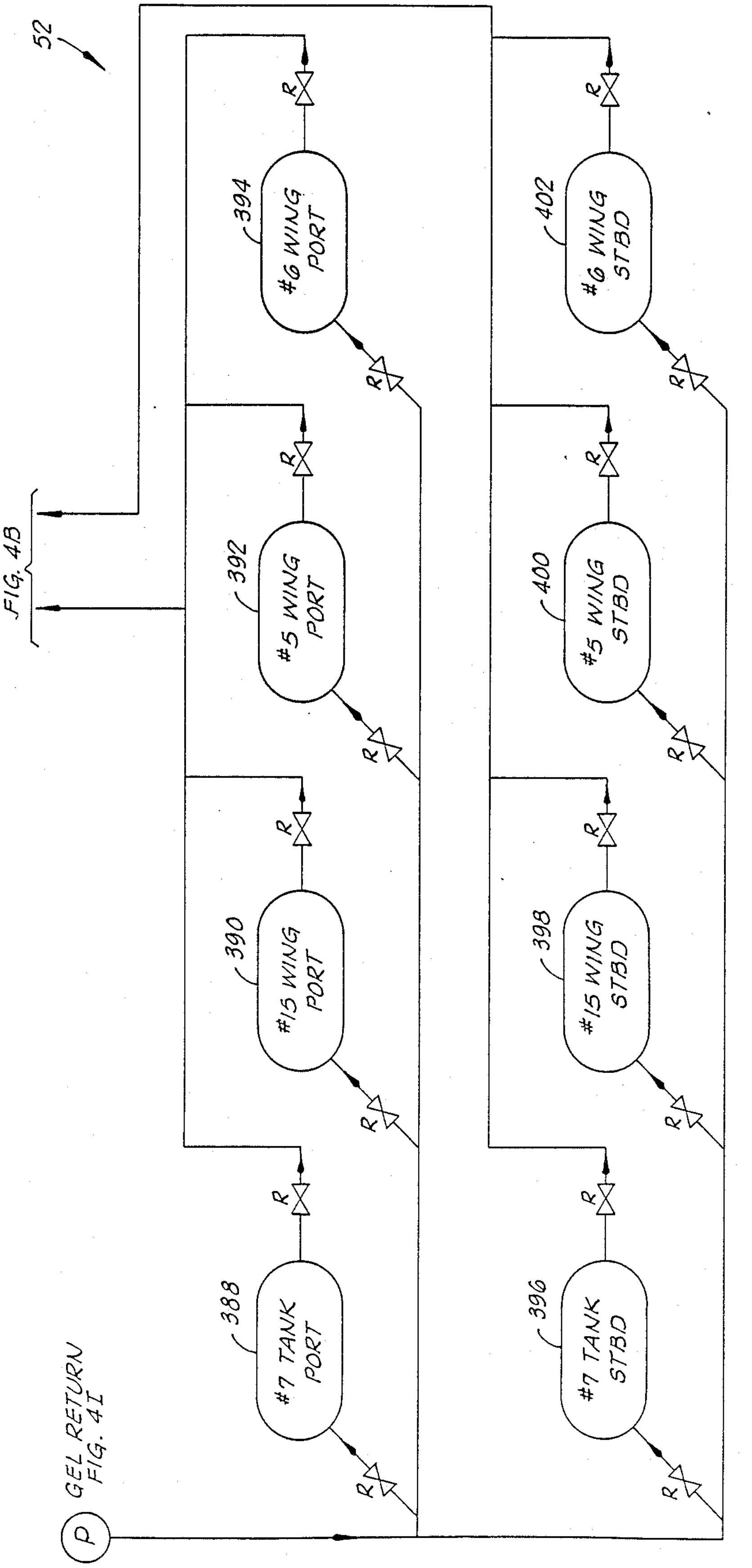
Figure 4D:
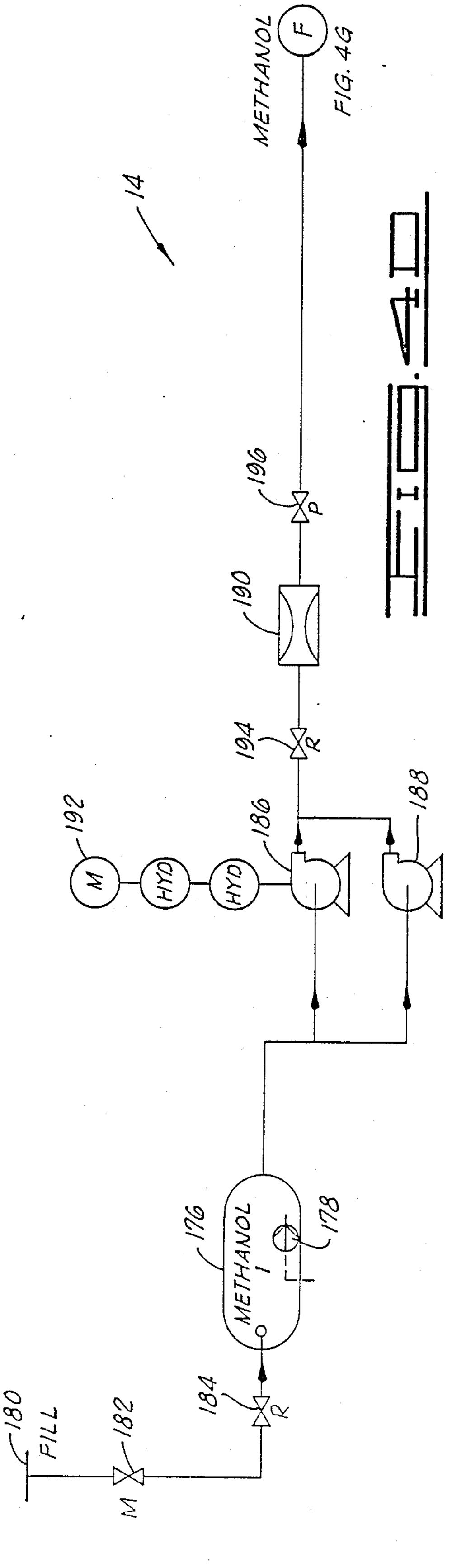
Figure 4E:
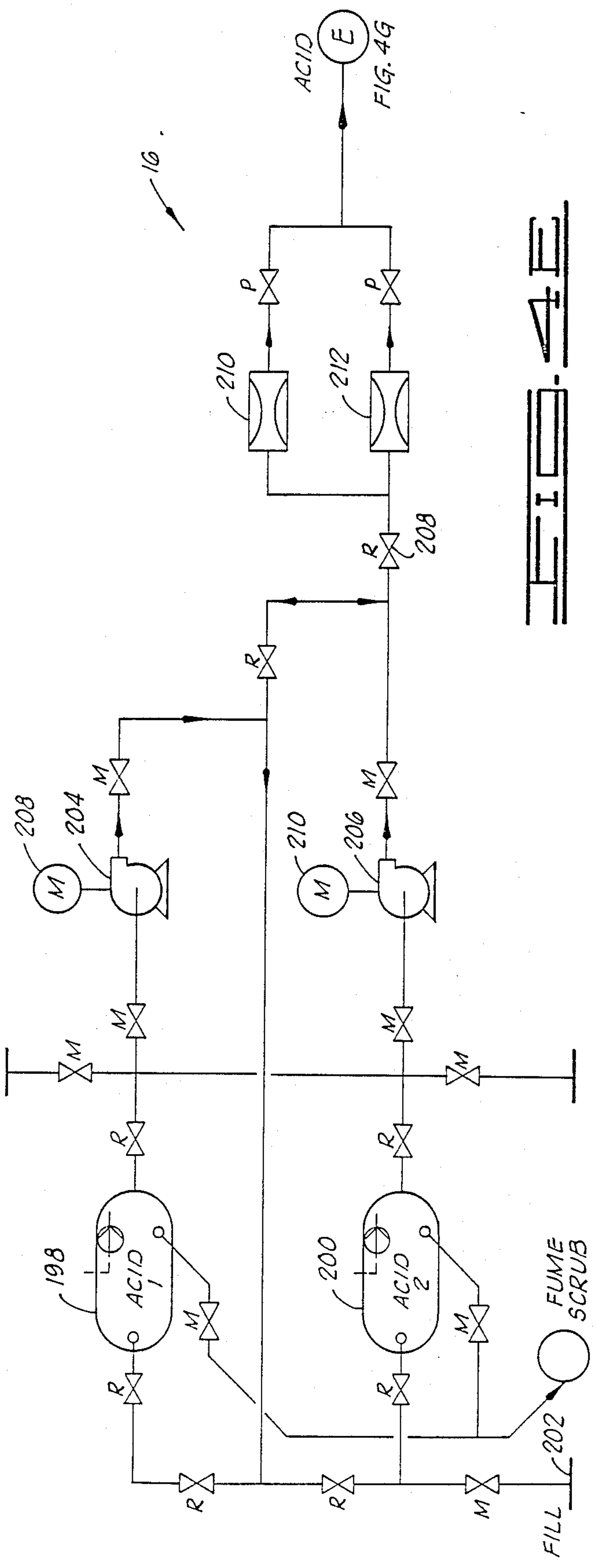
Figure 4F:
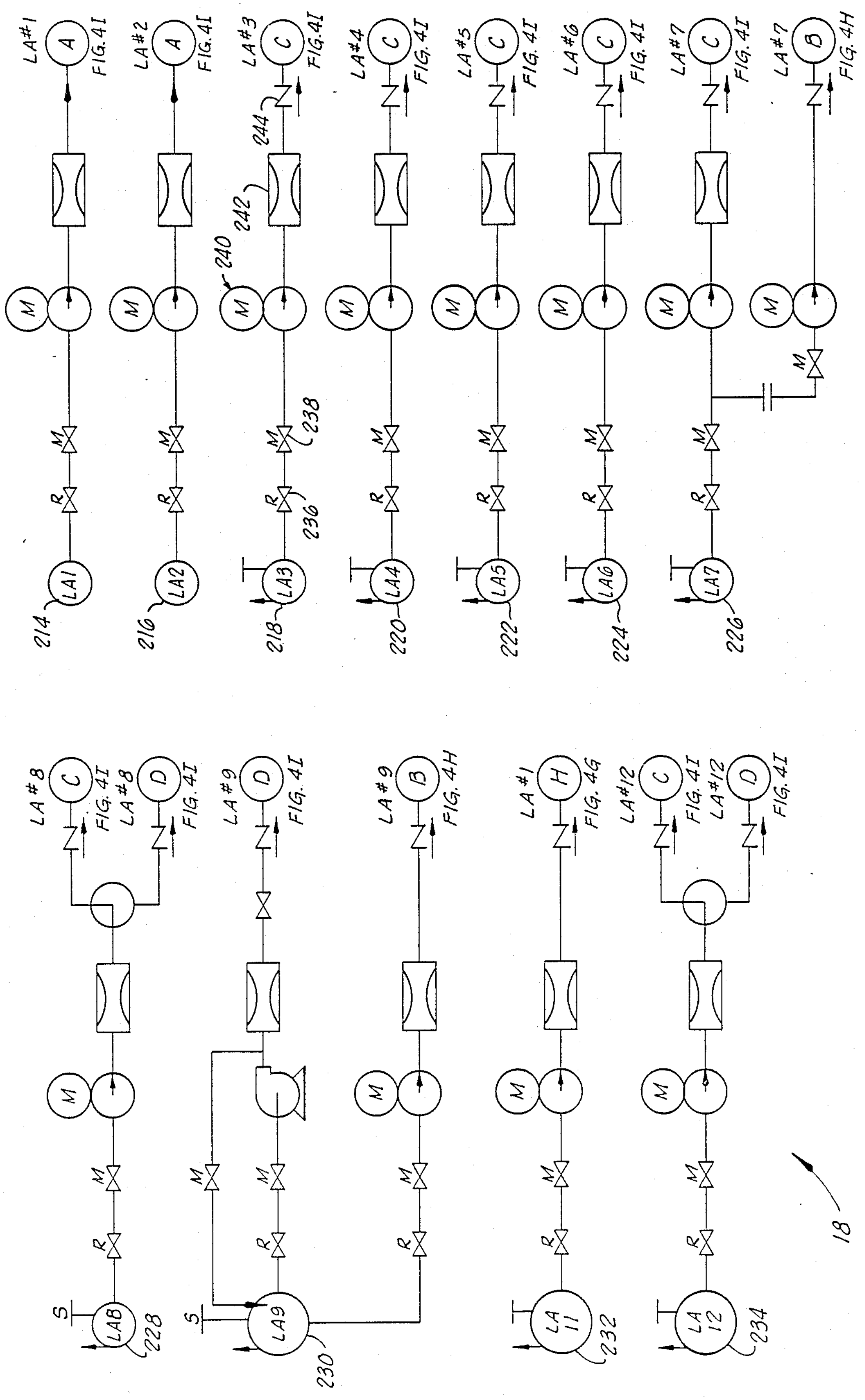
Figures 4G, 4I:
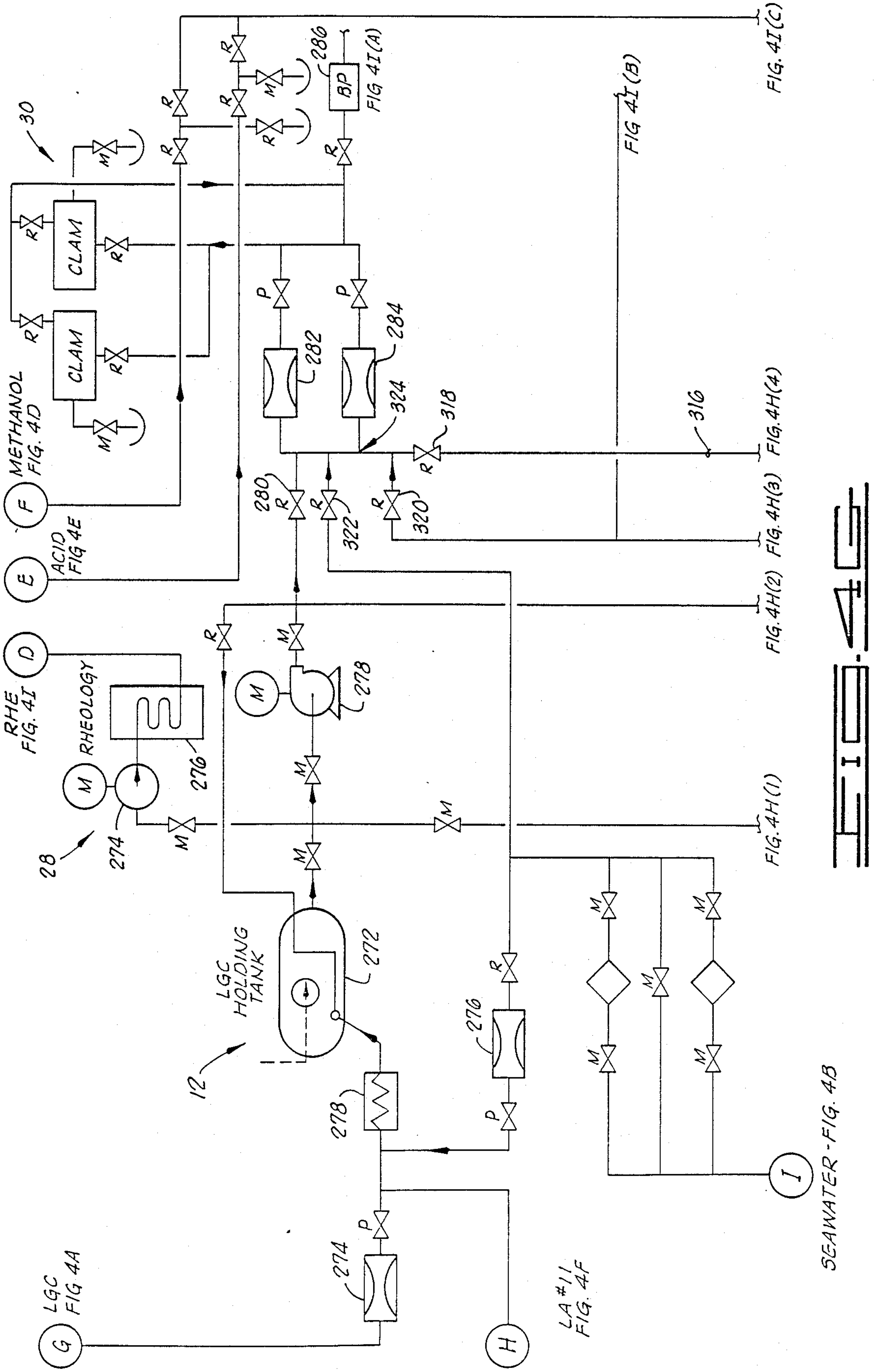

The blender circuit 26, shown more particularly in FIG. 4I, provides means for producing a blend of the mixture from the mixing subsystem means and of particulate material received from a proppant subsystem means. The proppant subsystem means is mounted on the transport means for storing particulate material and for transferring the particulate material to the blender circuit 26. As shown in FIG. 1, the preferred embodiment of the proppant subsystem means includes a proppant bulk storage circuit 38 which provides material to an intermediate proppant storage and conveying circuit 40 from which proppant is delivered to a proppant surge bin 42 for controlled input to the blender circuit 26. The bulk storage circuit 38 is located on the lower deck 4. A pneumatic transfer means is used to convey the proppant from the storage circuit 38 to the intermediate proppant circuit 40 located on the second tier 6. Proppant from the circuit 40 is then controllably conveyed to the proppant surge bin circuit 42, mounted on the third tier 8, for ultimate dumping into the blender circuit 26. The proppant subsystem means will be more particularly described with reference to FIGS. 2, 3 and 6–11B.

The blend produced in the blender circuit 26 is pumped by intensifiers 44, located on the third tier 8, in response to a driving fluid delivered by drive pumps 46 located on the second tier 6. The output from the intensifiers 44, into which vaporized liquid nitrogen from the circuit 22 can be added, is pumped, through a flexible hose 48 would on a winch mechanism 50 mounted on the second tier 6, into a well, such as an offshore well to which the ship 2 has transported the aforementioned subsystems. The pumping subsystem means including the circuits and elements 44, 46, 48, 50 will be more particularly described with reference to FIGS. 4J and 4K.

The output from the blender circuit 26 is switchably connectible to at least one of the pumping subsystem means, specifically to the intensifiers 44, or a gel return storage circuit 52 mounted on the first tier 4. The gel return storage circuit 52 will be more particularly described hereinbelow with reference to FIG. 4C.

FIGS. 2 and 3 disclose somewhat schematically the layout of individual elements included within the aforementioned circuits mounted on the second and third tiers 6, 8 or the ship 2. These individual elements will be identified during the following more detailed description of the pertinent circuits. Generally, however, these elements are suitably mounted on the ship 2 which is of any suitable type capable of ocean-going duty and of supporting and transporting the subsystems of the present invention as a unit to offshore wells.

The LGC storage circuit 10 of the preferred embodiment is shown in FIG. 4A. This circuit includes four storage tanks 54, 56, 58, 60 mounted on the lower deck 4. The tanks are filled through a fill inlet 62 and manual butterfly valves 64, 66, 68, 70. A centrifugal pump 72 and metering pumps 74, 76 provide controllable flows of the liquid gel concentrate to the LGC holding tank circuit 12 located on the upper deck 6, the circuit for which tank is shown in FIG. 4G. Associated with the pumps 74, 76 are motors 78, 80, respectively, which are controllable from the mixing control means contained in the control house 32. Pressure relief valves 82, 84 are also shown associated with the metering pumps 74, 76. FIG. 4A shows the outlet circuits from the tanks 54, 56, 58, 60 also include butterfly valves 86, 88, 90, 92, 94, 96, 98, 100 and check valves 102, 104, 106. The butterfly valves depicted throughout the drawings by the same symbol as is used in FIG. 4A are designated as either manually (locally) or remotely controllable by the letters "M" or "R," respectively. The letter "P" designates proportional valves.

Also located on the deck 4 are the diesel storage circuit 34 and the seawater storage circuit 36. These are shown in FIG. 4B as including starboard tanks ("seachest") 108 and port tanks ("seachest") 110. These contain seawater and diesel fluids which are provided through manually controllable valves 112, 114, 116, 118, 120, 122, 124 and filters 126, 128 to a manifold 130 for pumping through the four circuits labeled in FIG. 4B. The "DIESEL"and "SEAWATER" circuits connected elsewhere in the drawings as labeled; however, the "VAPORIZER" and "ENGINE COOLING" circuits connect into cooling systems which are not the subjects of the present claims and therefore are not further shown. Each of these circuits includes a check valve 132, a spool 134, a butterfly valve 136, a centrifugal pump 138 (driven by a motor 140), a pressure gauge 142, a temperature gauge 144, and a remotely controllable valve 146. The valve 136 is remotely controllable as is the valve 148. Corresponding valves 150, 152 are manual valves. Also associated with these circuits are butterfly valve 154 and spools 156, 158, 160, 162, 164, 166. A manifold 168 receives flows from the gel return storage circuit 52 shown in FIG. 4C. The manifold 168 is connected through remotely controllable butterfly valves 170, 172 and manual valve 174 to the pumping circuits as shown in FIG. 4B.

Located above the deck 4 on the deck 6 is the methanol circuit 14 shown in FIG. 4D. This includes a storage tank 176 having a fluid level transducer 178. The tank 176 is filled through a fill inlet 180 and manual valve 182 and remotely controllable valve 184. Flow from the tank 176 is effected through centrifugal pumps 186, 188, which flow is detected by a flow meter 190. A motor 192 derives the pumps 186, 188. A valve 194 and a valve 196 are disposed in the outlet conduit through which the methanol flows.

Also mounted on the deck 6 is the acid circuit 16 which is shown in FIG. 4E. Two acid tanks 198, 200 provide storage on the deck 6. The tanks 198, 200 are filled through a fill inlet 202. Flows are obtained from the tanks 198, 200 by centrifugal pumps 204, 206, respectively, driven by motors 208, 210, respectively. These flows are provided through a common remotely controllable valve 208 to a parallel circuit, each branch of which includes a respective flow meter 210, 212. The circuit also includes the illustrated butterfly valves which are either manually or remotely controllable as indicated by the "M" and "R" labels. Because these valves are of any suitable type as known to the art, each valve throughout the remainder of the circuits will not be specfically identified but will be labeled to indicate whether it is a manually or remotely controllable valve. The remote control is effected from the control house 32 through suitable servomechanisms of types known to the art.

The liquid additives circuit 18 is shown in FIG. 4F as including a plurality of individual flows from eleven liquid additive tanks 214, 216, 218, 220, 222, 224, 226, 228, 230, 232, 234. Each of these tanks includes a suitable liquid additive of one or more types as known to the art. The output flow lines from these tanks have the indicated valves, pump/motor combinations, and flow meters. Representative ones of these elements are valves 236, 238, metering pump/motor combination 240, flow meter 242 and check valve 244. The flows from these lines go to the indicated portions in the other drawings as designated in FIG. 4F.

Figure 7:
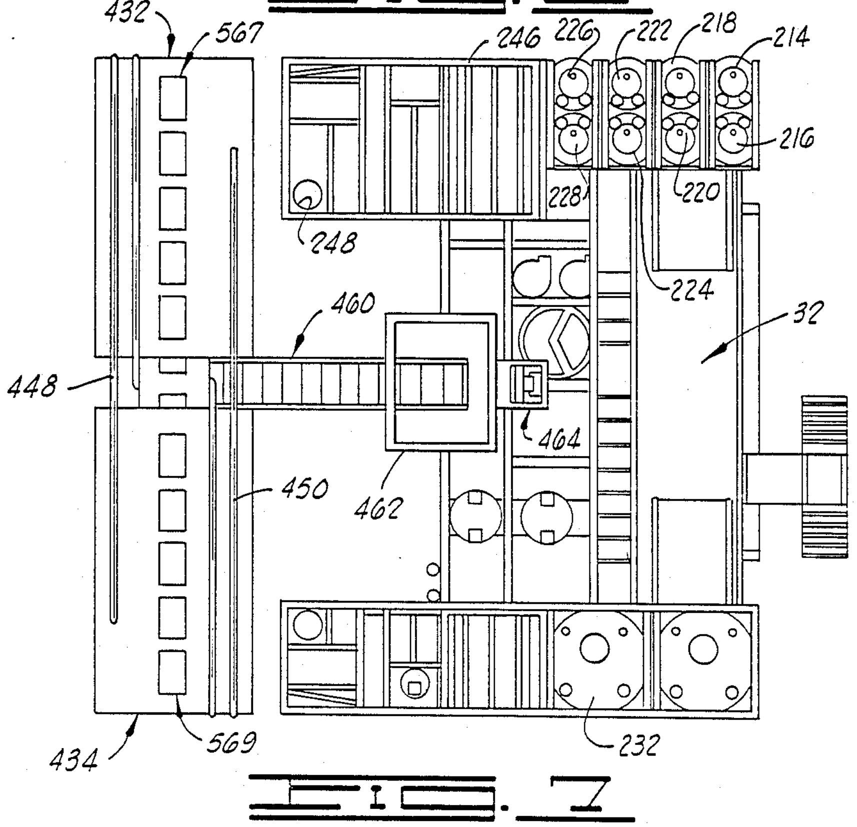
FIG. 7 is a plan view of the part shown in FIG. 6.
Figure 8:
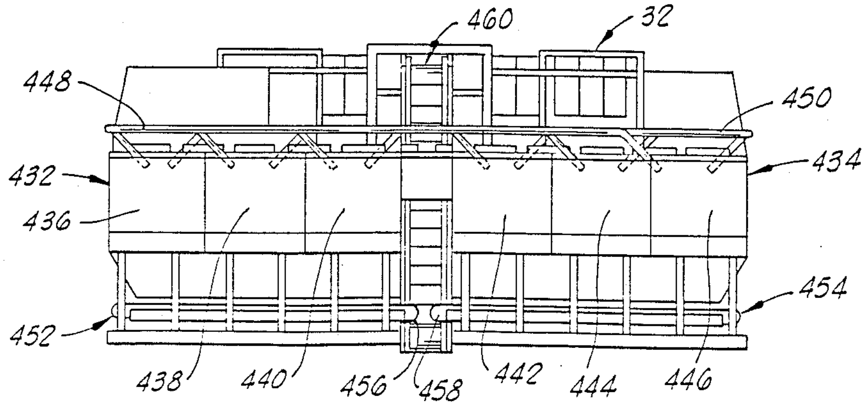
FIG. 8 is another elevational view of the part shown in FIG. 6.

The dry additives portion 20 of the preferred embodiment of the present invention includes a housing 246 illustrated in FIG. 7. The housing 246 contains sacks of known dry additives which can be dumped through an opening 248 into the batch mixer circuit 24 or into the continuous liquid additive mixing circuit 30.

One other additive of the mixing subsystem is the liquid nitrogen provided from the liquid nitrogen circuit 22. The preferred embodiment of this circuit is shown in FIG. 4L. The circuit 22 includes storage tanks 250, 252 shown in FIGS. 2 and 3 as being mounted on the deck 6. Each tank 250, 252 has respective level sensing switches 254 associated therewith. The tank 250 has a pump 256 associated therewith, and the tank 252 has a pump 258 associated therewith. The pumps 256, 258 can be deactivated in response to a thermocouple 260 detecting a sufficiently high temperature in an output circuit provided through pumps 262 and a vaporizer 264 of types as known to the art. The thermocouple 260 also deactivates the pumps 262 and pumps 266, which provide a flow to a vaporizer 268. Another thermocouple, identified by the reference numeral 270, can also deactivate the pumps 256, 258, 262, 266 when a sufficiently high temperature is detected in the vaporized flow.

FIG. 4G schematically shows the LGC holding tank circuit 12, the rheology circuit 28 and the continuous liquid additive mixing circuit 30. The LGC holding tank circuit 12 includes a tank 272 which receives a selectably mixed flow of the liquid gel concentrate, liquid additive #11, and seawater. The liquid gel concentrate and seawater flows are monitored through flow meters 274, 276, respectively. The mixing of the selected ones of these three fluids occurs in a mixer 278.

The rheology circuit 28 receives a flow through a metering pump 274. The flow from this pump goes through a known rheology laboratory circuit contained in a housing mounted on the deck 6 of the ship 2. The rheology laboratory circuit performs known tests on the fluids to determine properties which can be used in analyzing substances from the LGC holding tank 272.

The flow from the holding tank 272 is also provided through a pump 278. This flow is switchably connectible through a remotely controlled valve 280 to a parallel circuit including flow meters 282, 284. The flow through the flow meters 282, 284 is input into the continuous liquid additive mixing circuit 30 which of a type as known to the art. The circuit 30 provides an output through a back-pressure valve 286 into the blender circuit 26.

Figure 4H:
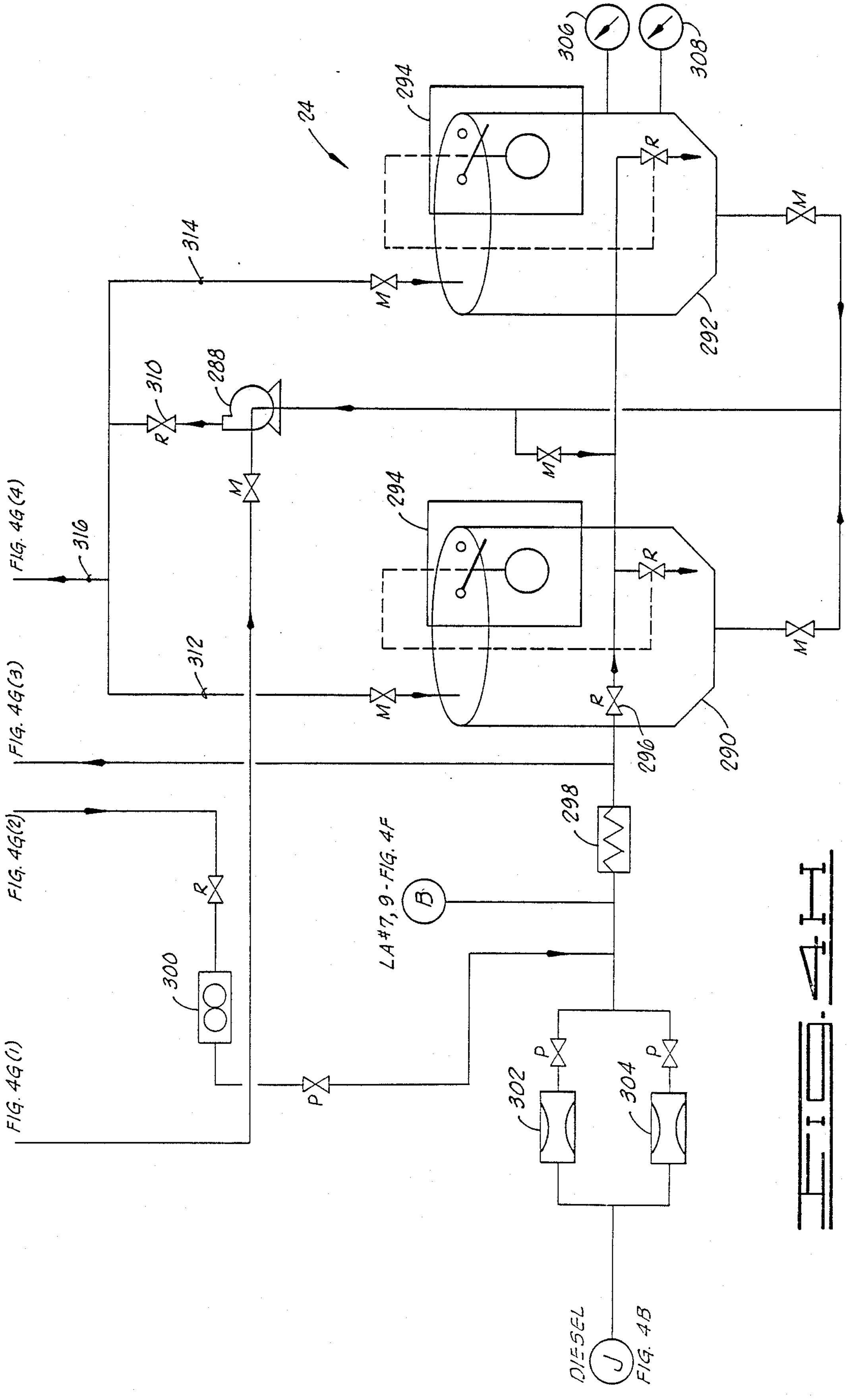
Figure 4I:
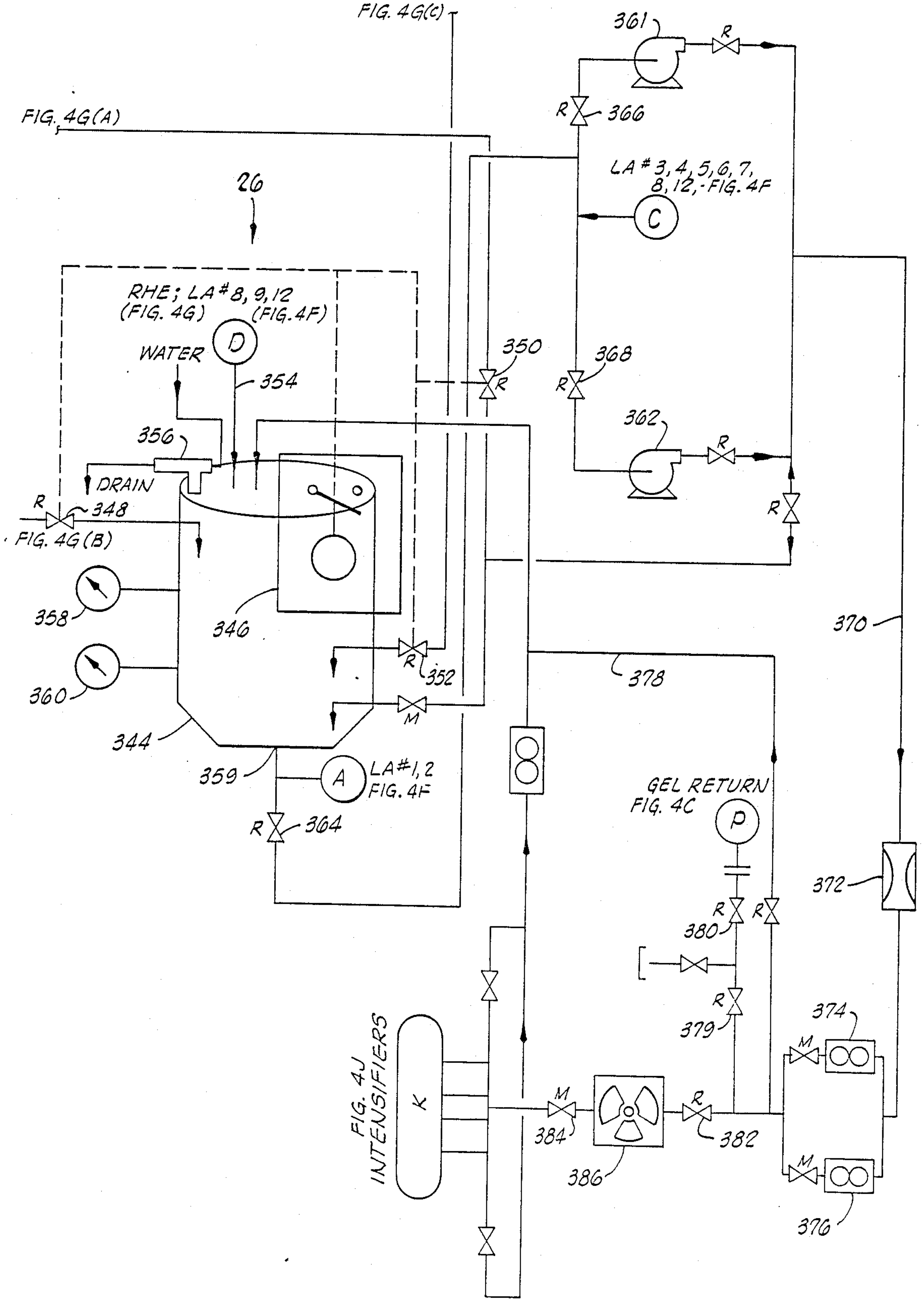

The output of the holding tank 272 can also be provided to a pump 288 shown in FIG. 4H as part of the batch mixer circuit 24. The batch mixer circuit 24 includes two batch mixing tubs 290, 292 of types as known to the art. Each of these tubs is shown as including a respective level switch 294 which controls a respective drain valve as indicated in FIG. 4H. It is into these tubs 290, 292 that the dry additives can be dumped from the dry additives circuit 20. The tubs 290, 292 also receive input through a remotely controllable valve 296 from a mixer 298 which mixes selectably input fluids from the output of the pump 278 (which flow is monitored through a flow meter 300), from the diesel circuit shown in FIG. 4B (which is monitored through flow meters 302, 304), and liquid additives #7 and 190 9 from FIG. 4F. The pressure in the tubs is monitored by pressure gauges 306, 308. The mixture from the tubs 290, 292 is pumped out, and recirculated by, the pump 288.

The output from the pump 288 flows through a remotely controllable valve 310, through which both a recirculating flow and an output flow are provided. The recirculating flow occurs through lines 312, 314 and the output flow is provided through line 316. The output flow through the line 316, a flow from the output of the mixer 298, and a flow from the seawater circuit 36 are connected through remotely controllable valves 318, 320, 322 (FIG. 4G), respectively, into a manifold point 324 which is common with the flow received through the valve 280. This construction provides selectable flows to the parallel connected flow meters 282, 284 for introduction into the continuous level additive mixing circuit 30.

Figure 5:
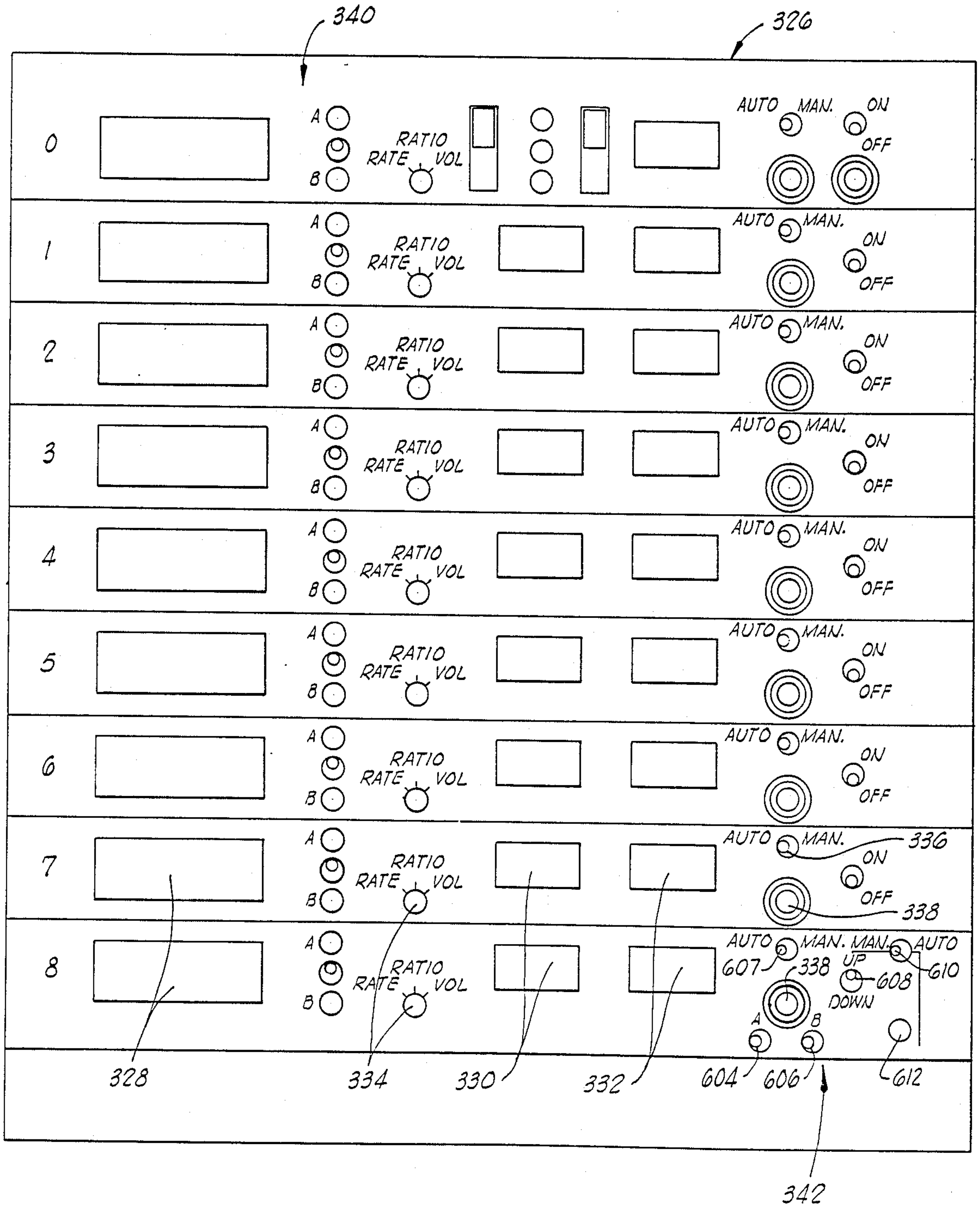
FIG. 5 depicts a control panel for controlling the operation of the circuits of the mixing subsystem means.
Figure 6:
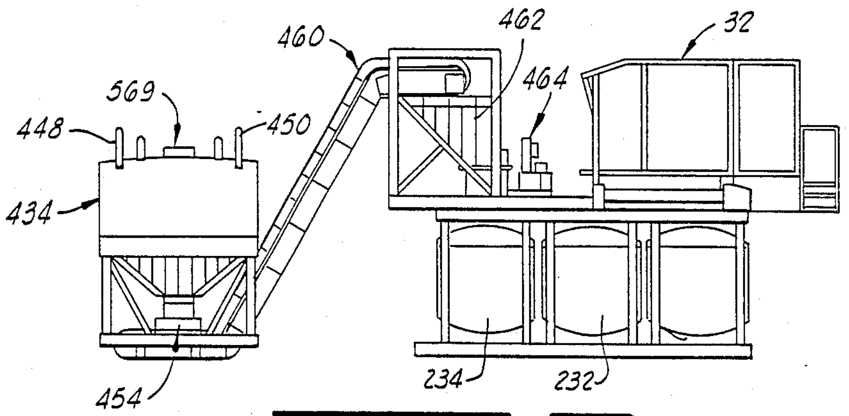
FIG. 6 is an elevational view showing part of a proppant subsystem means of the preferred embodiment of the present invention.

The flows which occur through the previously described portions of the mixing subsystem are controlled by monitoring the flows through the illustrated flow meters and by controlling the motors of the pumps in response to the detected flows and preselected values entered into a control panel 326 shown in FIG. 5. The control panel 326 is mounted in the control house 32. The control panel 326 is similar to a corresponding control panel disclosed in U.S. Pat. No. 4,538,221 and U.S. Pat. No. 4,538,222 both of which patents are owned by the assignee of the present invention and both of which patents are incorporated herein by reference. Because the control panel 326, and its related circuitry and method of operation are known as disclosed in the aforementioned applications, both of which have been allowed and passed to issuance, a detailed description of the control panel 326 or its method of controlling the previously described circuits will not be made. In general, however, the control panel 326 includes sections associated with different flows to be controlled. Each section includes a display 328 and thumbwheel switches 330, 332 by which preselected parameters are entered. For example, a desired concentration ratio can be entered which is then used to control the respective pump/motor combination, which provides a flow detected by the respective flow meter, to achieve the proper mixture of substances. Each section also includes a parameter selection switch 334 and an auto/manual switch 336. A potentiometer 338 is used for achieving direct speed control of the associated pump. The control panel 326 also includes a master channel portion 340 of a type similar to the master channel described in the aforementioned applications. The panel 326 also includes a portion 342 used to control part of the proppant subsystem as described hereinbelow. More than one of these panels is used in the preferred embodiment to control the number of flows described hereinabove.

Under control of the control panel 326, and switches (not shown) located in the control house 32 for operating the remotely controllable valves, the selected flows are provided to the batch mixer circuit 24 and to the blender circuit 26, which circuit 26 is shown in FIG. 4I. The circuit 26 includes a blender tub 344 of a type as known to the art. It includes a level sensor switch 346 that controls valves 348, 350, 352 and thus controls the input flows provided through those valves. Inputs to the tub 344 are also provided through a line 354 which receives flows from the rheology circuit 28 (FIG. 4G) and liquid additives #8, #9 and #12 from the liquid additives circuit 18 (FIG. 4F). Also provided to the tub 344 is water which flows through a scrubber 356. The pressure within the tub is monitored by pressure gauges 358, 360.

The flows received in the blender tub 344 are blended by suitable means known to the art within the tub and provided to an outlet 359 which communicates with pumps 361, 362 through remotely controllable valves 364, 366, 368 as shown in FIG. 4I. Into this flow there can be added selectable ones of the liquid additives #3, #4, #5, #6, #7, #8 and #12 from FIG. 4F. This provides a blended, supplemented flow through a line 370 having a flow monitored by a flow meter 372. This flow is split into a parallel circuit containing flow meters 374, 376. Out of this parallel circuit the flow is switchably connectible to at least one of a blender return loop (through a line 378), the gel return storage circuit 352 (through remotely controllable valves 379, 380), and the intensifier circuit 44 (through valves 382, 384 and radioactive densometer 386). When the valves 379, 380 are opened, a flow of the blend is provided to whichever port tanks 388, 390, 392, 394 and starboard tanks 396, 390, 400, 402, included within the gel return storage circuit 52 shown in FIG. 4C, have their associated inlet valves open. When the valves 382, 384 are opened, the blend is provided to the intensifier circuit 44 of the pumping subsystem which is more particularly illustrated in FIGS. 4J and 4K.

Figure 4J:
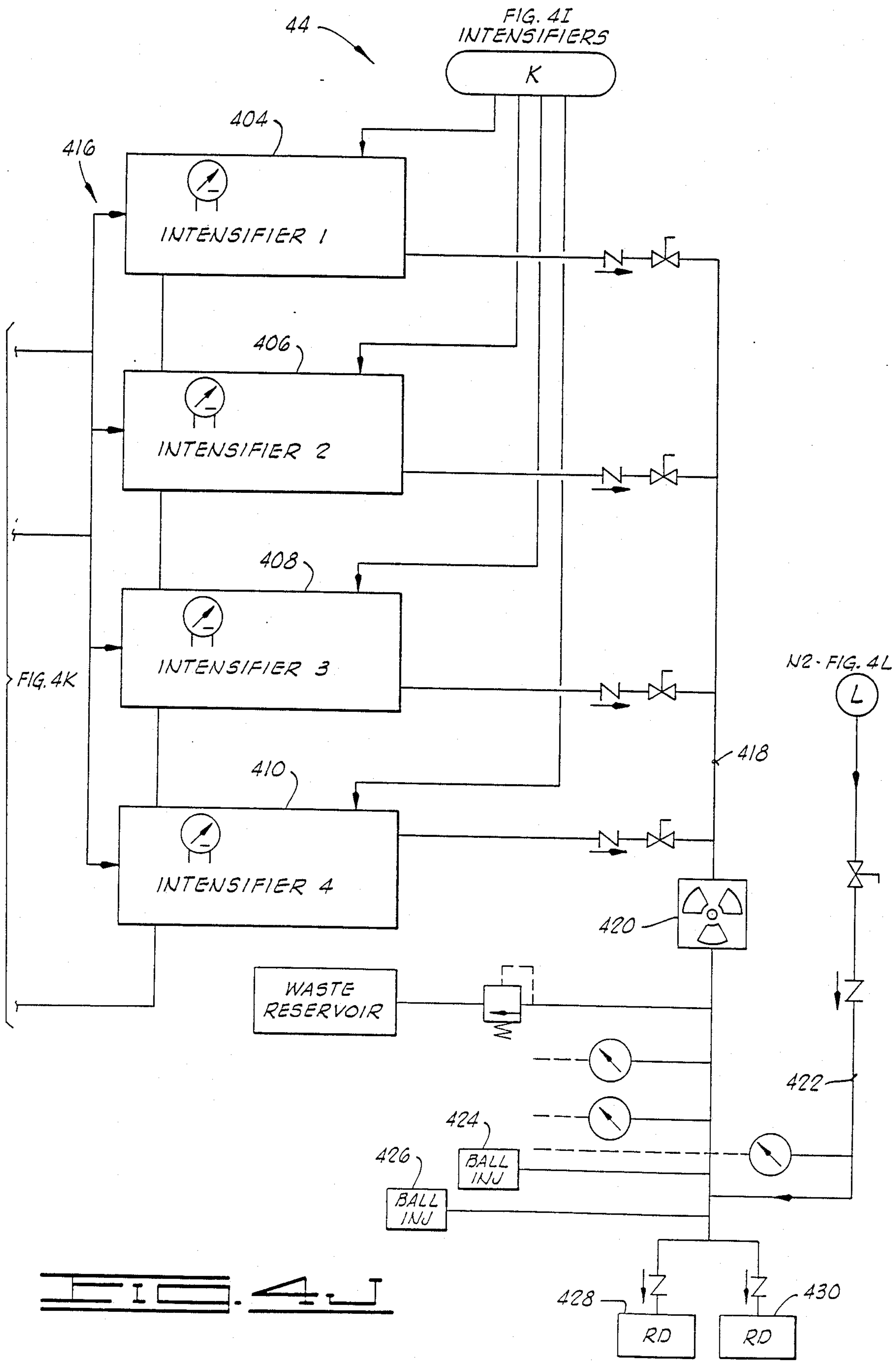
Figure 4K:
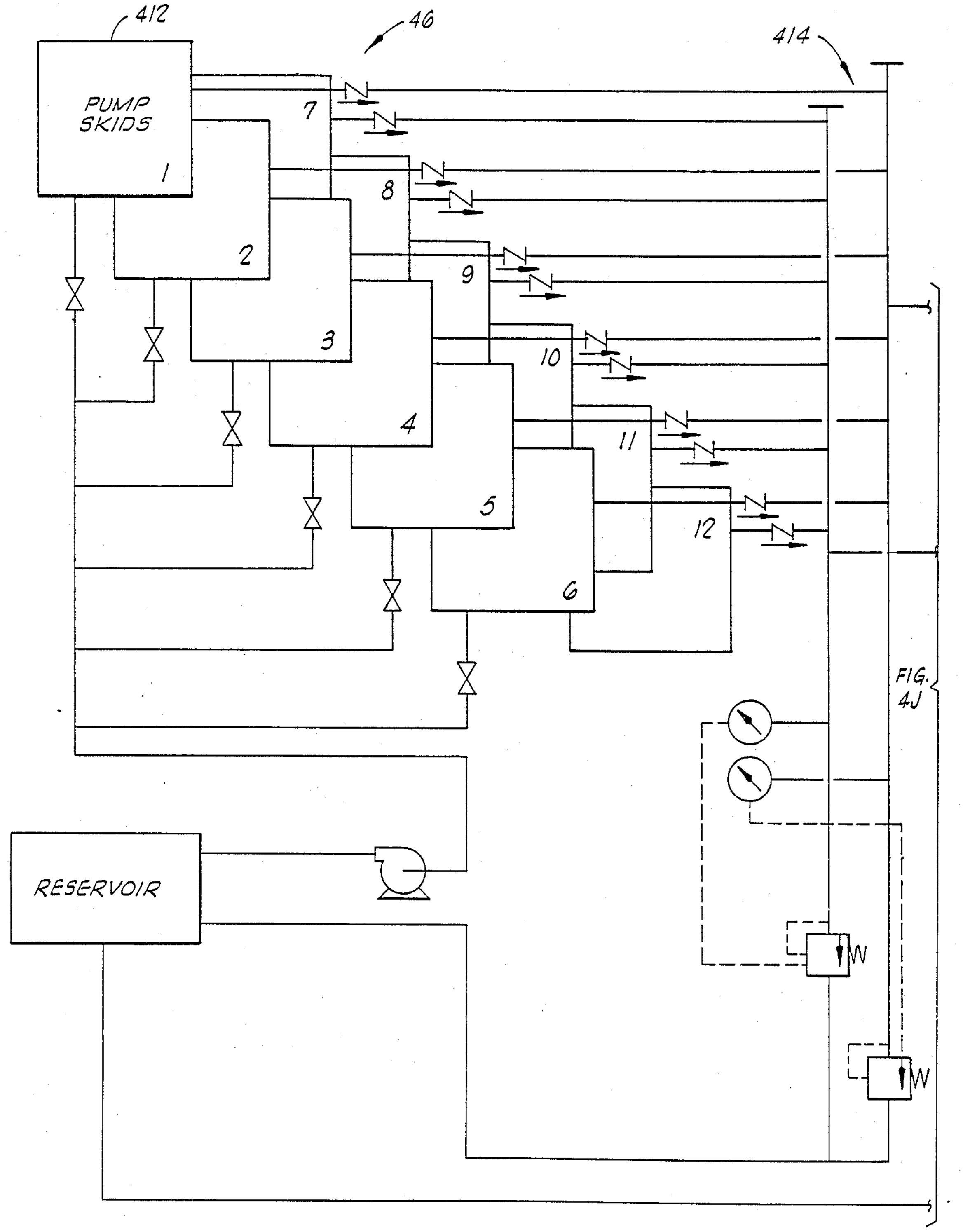
Figure 4L:
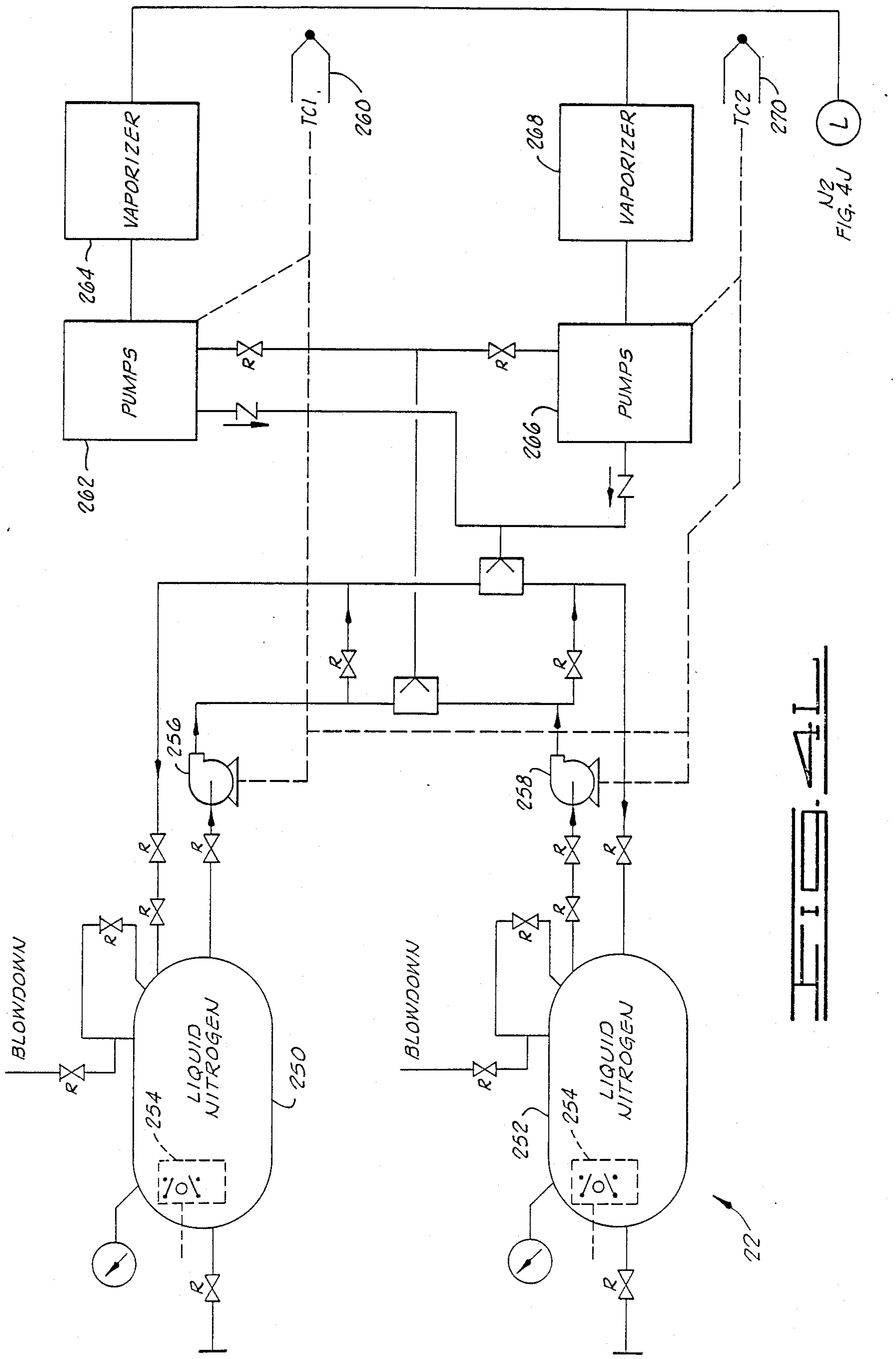

FIG. 4J shows that the preferred embodiment of the intensifier circuit 44 includes four intensifiers 404, 406, 408, 410, such as Halliburton Services HT-1000B intensifiers. Each of these intensifiers is driven by the pumps mounted on pump skids 412 shown in FIG. 4K. The pump skids 412 include Halliburton Services HT-400 pump in the preferred embodiment. The pump skids are contained within a suitable actuating circuit as shown in FIG. 4K. The outputs from the pumps of the pump skids 412 provide a driving fluid through manifolds 414 to driving fluid inputs 416 of the respective intensifiers 404, 406, 408, 410. In response to these driving fluids, the intensifiers 404, 406, 408, 410 pump the blend received through the valves 382, 384 to an outlet line 418 having a radioactive densometer 420 disposed therein. Communicating with the line 418 is a line 422 through which the vaporized liquid nitrogen (FIG. 4L) is added to the flow from the intensifiers. Fracturing ball injectors 424, 426 of types as known to the art inject balls into the fracturing fluid developed by the preferred embodiment of the present invention. This ultimate combination of substances of materials is flowed through remote disconnectors 428, 430 releasably connected with the hose 48 wound on the reel 50.

Providing another part of the flow which comes from the blender circuit 26 is the proppant subsystem containing the proppant bulk storage circuit 38, the proppant circuit 40 and the proppant surge bin circuit 42.

The proppant bulk storage circuit 38 includes a plurality of bins containing sand or other particulate material known as proppant. These bins are mounted on the deck 4 as indicated by the block shown in FIG. 1.

The proppant circuit 40 includes storage bins 432, 434 shown in FIGS. 2–3 and 6–8. The storage bin 432 includes a compartment 436, a compartment 438, and a compartment 440; and the bin 434 includes a compartment 442, a compartment 444, and a compartment 446. A conduit 448 communicates between one of the storage bins located on the deck 4 and each of the compartments of the storage bins 432, 434. Another conduit 450 communicates between another storage bin on the deck 4 and each of the compartments of the storage bins 432, 434.

Each of the compartments 436, 438, 440 has an outlet which communicates with a branch conveyor 452; and each of the compartments 442, 444, 446 has an outlet which communicates with another branch conveyor 454. The conveyors 452, 454 are of any suitable type for receiving the particulate material from the associated compartments and conveying them to respective ends 456, 458, both of which ends overlie a lower portion of a trunk conveyor 460 which moves the particulate material from its lower portion to an upper portion associated with a surge bin 462 forming part of the proppant surge bin circuit 42. The conveyors and the surge bin 462 are of any suitable type as known to the art, such as of the type disclosed in U.S. Pat. No. 4,701,095, assigned to the assignee of the present invention and incorporated herein by reference.

Figure 9:
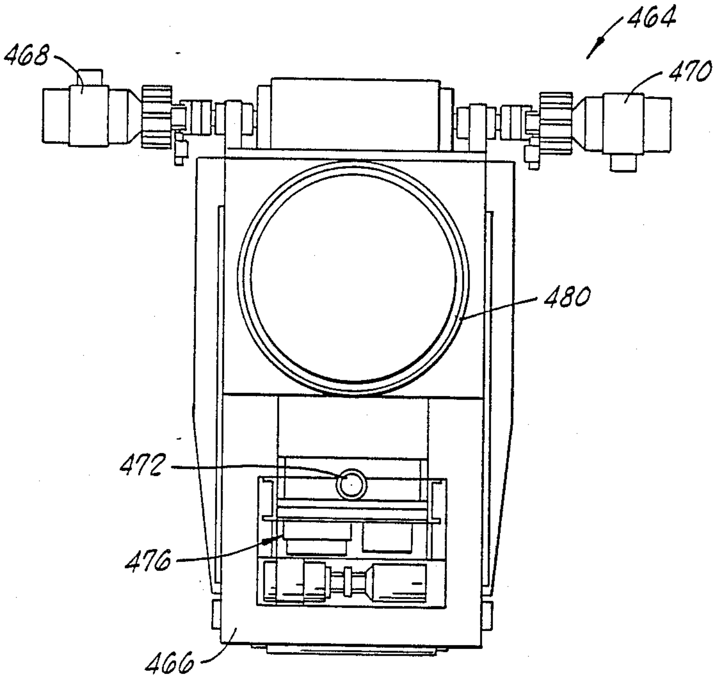
FIG. 9 is a plan view of a metering conveyor of the proppant subsystem means.
Figure 10:
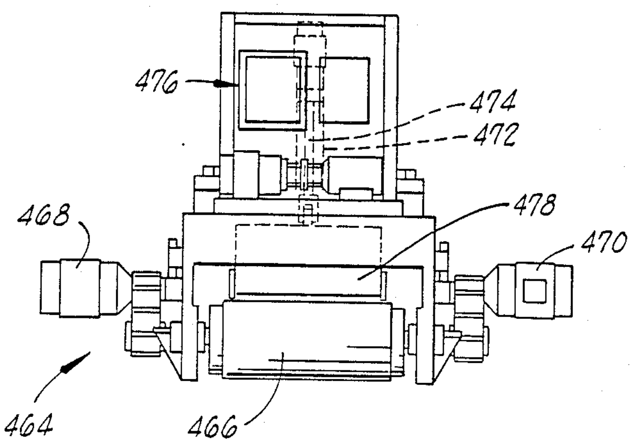
FIG. 10 is an elevational view of the metering conveyor shown in FIG. 9.

Disposed below the surge bin 462, and forming another part of the proppant surge bin circuit 42, is a metering conveyor 464 more particularly shown in FIGS. 9 and 10. The metering conveyor 464 includes a conveyor belt 466 and associated drive mechanism having drive motors 468, 470. Disposed above the conveyor belt 466 is a gate means for defining a maximum cross-sectional area through which the proppant will be moved by the conveyor belt 466 prior to the material being dumped from the end of the conveyor belt 466 shown in FIG. 10 into the blender tub 344, above which the metering conveyor 464 is disposed as illustrated in FIG. 7, for example. The gate means includes, in the preferred embodiment, a piston housing 472 having a piston 474 movably disposed therein for hydraulic movement in response to actuation of hydraulic control members 476. The piston 474 has a lower end connected to a screed 478 which is vertically movable by the piston 474 from a position adjacent the conveyor belt 466 to a selectable height thereabove. The metering conveyor 464 is rotatable relative to the surge bin 462 through a turntable jacket 480.

Figure 11A:
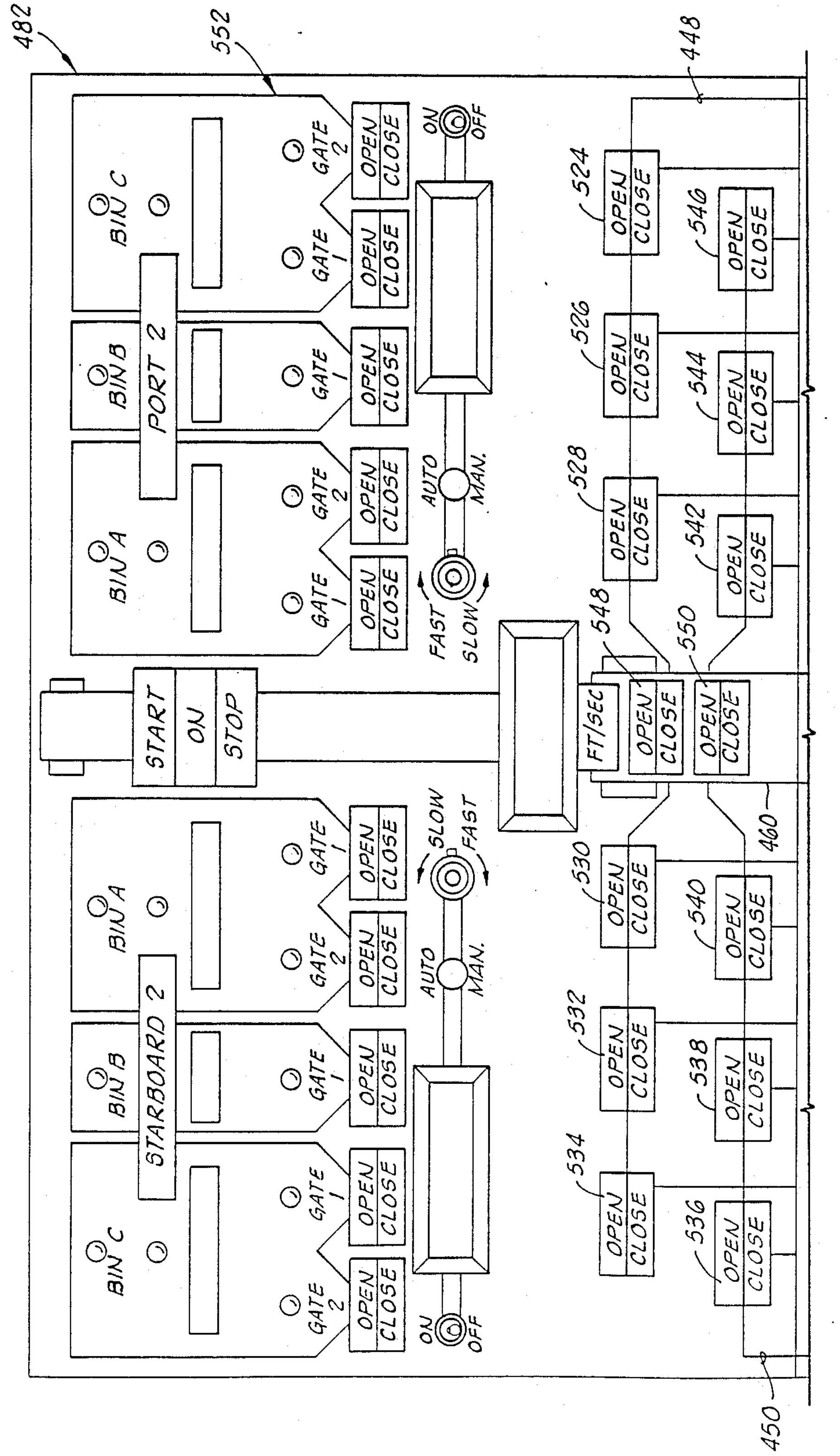
FIGS. 11A and 11B depict a control panel for controlling the proppant subsystem means.
Figure 11B:
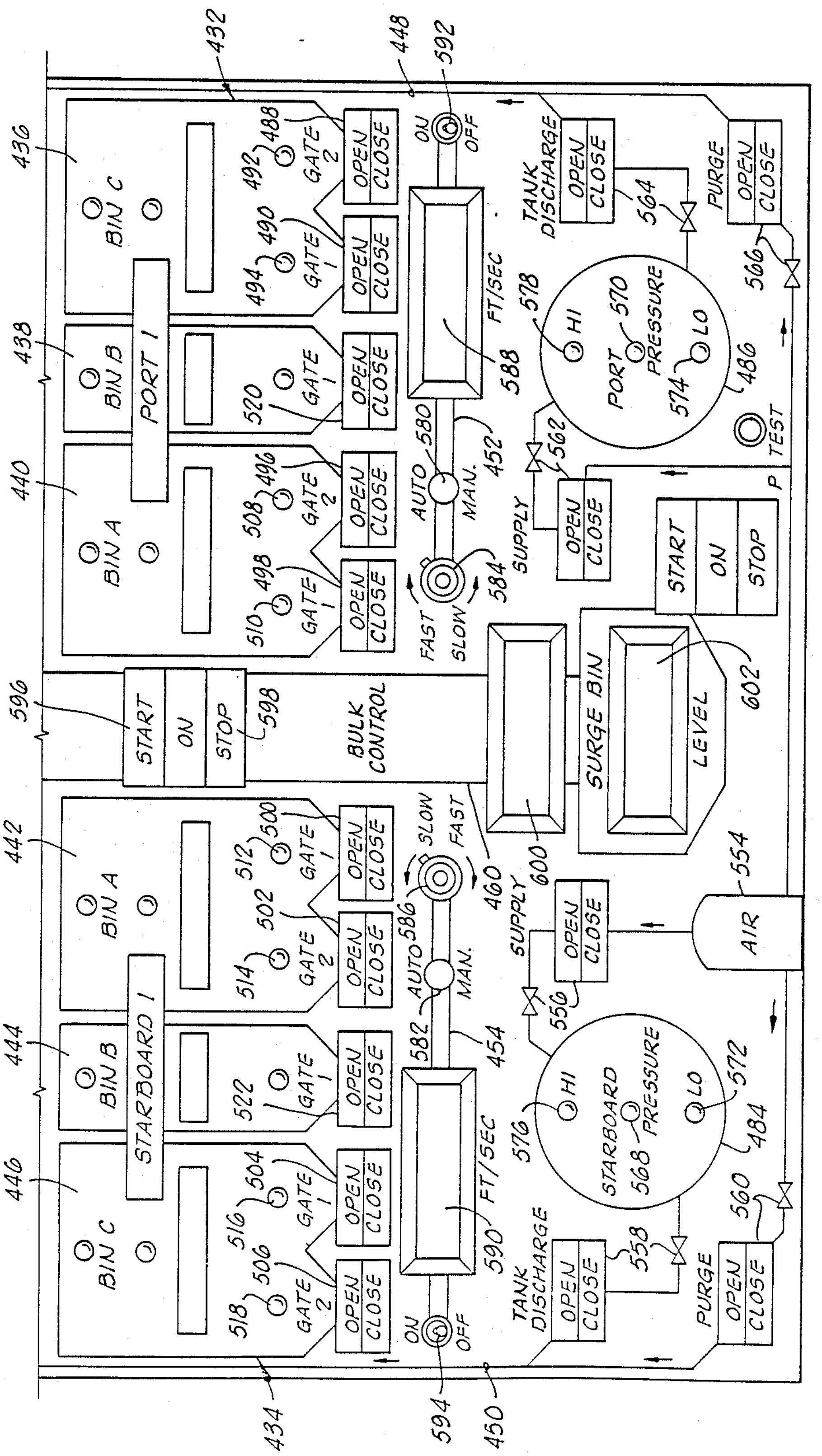

The flow of the proppant through the circuits 38, 40 and 42 is controlled from a control panel 482 contained in the control house 32 and shown in FIGS. 11A and 11B. The control panel 482 has a schematic diagram corresponding to the storage bins and conveyors of the proppant bulk storage circuit 38 and the proppant circuit 40. This diagrammatic representation includes a symbol 484 representing a starboard bin or container mounted on the deck 4 as part of the proppant bulk storage circuit 38 and a symbol 486 representing a port storage bin or container of this circuit. FIG. 11B also shows diagrammatic representations of bins or containers 432, 434 as indicated by like reference numerals in FIG. 11B. The bin 432 has the bins or compartments 436, 438, 440, and the bin 434 has the bins or compartments 442, 444, 446. The compartment 434 has two gates in its outlet, each of which gates has a respective valve associated therewith which can be actuated into an open or closed position by a respective one of switches/indicators 488, 490. Whether a gate is open is indicated by a lamp 492, 494. The compartments 440, 442, 446 have similar double-gate outlets as indicated by the respective switches/indicators 496, 498, 500, 502, 504, 506 and the indicator lamps 508, 510, 512, 514, 516, 518. The compartments 438, 444 have single gate outlets including valves controlled by the switches/indicators 520, 522 shown in FIG. 11B.

The conveyors 452, 454 are also shown represented on the control panel 482 as indicated by the like reference numerals used in FIG. 11B. The trunk conveyor 460 is also diagrammatically represented on the control panel 482 as shown in FIGS. 11A and 11B.

The conduits 448, 450 interconnecting the storage bins of the circuit 38 with the storage bins of the circuit 40 are also diagrammatically represented as indicated by the like reference numerals labelling the lines shown in FIGS. 11A and 11B. The conduits 448, 450 have outlet valves associated therewith near where the conduits communicate with the respective bin compartments. These valves are manually opened and closed, which opened and closed status is indicated by indicators 524, 526, 528, 530, 532, 534 and by indicators 536, 538, 540, 542, 544, 546. Disposed within the conduit 448 between the valves associated with the indicators 528, 530 is a manual valve having an indicator 548 associated therewith. Disposed within the conduit 450 between the valves associated with the indicators 540, 542 is a valve having an indicator 550 associated therewith.

Also shown in FIG. 11A is a diagram 552 and associated indicators and control switches to be used with another set of storage bins not implemented in the previously described preferred embodiment of the present invention. This portion 552, however, indicates the ability of the present invention to be expanded to accommodate additional circuits.

In operation, the control panel 482 is used to transfer a supply of the proppant stored in the bulk storage containers mounted on the deck 4 as represented by the elements 484, 486 shown in FIG. 11B. Also located on the deck 4 is an air supply 554 for providing driving air to blow or otherwise transfer the proppant from the bins 484, 486, through the conduits 448, 450, to the selected compartments of the bins 432, 434. The air flow is controlled through the depicted valves shown in FIG. 11B associated with switches/indicators 556, 558, 560 and 562, 564, 566. To transfer material from the bins 484, 486, corresponding ones of hatches 567, 569 (FIG. 7) on the storage bin compartments being filled are unlatched to relieve any pressure that could build up should vent lines from the compartments become blocked. One of the air supply valves 556 or 562 is opened to pressurize the respective storage bin 484 or 486. The appropriate valves at the outlets of the conduits 448, 450 are opened depending upon which compartments the proppant is to be moved into. With one of the air supply valves 556 or 562 opened, pressure begins to build in the respective bin until a predetermined pressure level is reached as indicated by the respective one of lamps 568 or 570. When the appropriate pressure level is achieved (e.g., 75 psi in the preferred embodiment), the system is ready to start transferring material. To transfer, first the respective purge valve 560 or 566 is opened, and then the respective discharge valve 558 or 564 is opened to allow the proppant to move. The levels in the compartments 436, 438, 440, 442, 444, 446 are monitored and the associated valves allowing the material to flow into those compartments are suitably controlled to prevent overfilling of any one compartment. To stop the proppant transfer or when a low level light 572 or 574 (FIG. 11B) comes on or the pressure light 568 or 570 goes off, the respective discharge valve 558 or 564 is closed to stop the material transfer. The purge valves are maintained open to allow the purge air to clean the lines for a suitable time, such as approximately thirty seconds, after which the respective one of valves 560, 566 is closed.

To show that the material within the bins 484, 486 is at a high level, the control panel 482 also includes high level indicator lamps 576, 578 shown in FIG. 11B.

With proppant stored in the storage bins 432, 434, proppant can then be moved up to the surge bin 462 for further use in controllably adding proppant into the blender tub 344. To do this, the appropriate valves at the gates of the selected compartments of the bins 432, 434 are opened to allow proppant to move onto the conveyors 452, 454. Each of these conveyors is automatically or manually controlled by selection through a respective one of switches 580, 582 shown in FIG. 11B. The speeds of the branch conveyors 452, 454 are selected by setting potentiometers 584, 586, respectively. In the preferred embodiment the potentiometers are used to set the speeds of the respective branch conveyors as percentages of the speed of the metering conveyor 464. The actual speeds of these branch conveyors are indicated in displays 588, 590, respectively. The branch conveyors are turned on and off by switches 592, 594, respectively.

To start the trunk conveyor 460, a start switch 596 is activated. To stop it, a stop switch 598 is activated. The speed of the trunk conveyor 460 is shown in a display 600. The conveyor 460 is a constant speed conveyor controlled to move at a constant speed sufficient to move the load placed onto the trunk conveyor by the branch conveyors. As the trunk conveyor 460 moves proppant into the surge bin 462, the level of the material in the surge bin is indicated by a display 602.

To transfer the material from the surge bin 462 to the blender tub 344, the metering conveyor 464 is suitably controlled from the control panel 326 shown in FIG. 5. This control is from the portion 342 which includes switches 604, 606 for selecting which of the motors 468, 470 is to drive the conveyor belt 466. An automatic/-manual mode select switch 607 is used to control the speed of the metering conveyor in either an automatic mode or a manual mode. In the automatic mode the speed is based on the concentration value entered through the switches 330, 332 for channel 8 associated with the portion 342 of the panel 326 (the concentration value is selected for the quantity of proppant to be added relative to the main flow of fluid). In the manual mode the speed is based on the setting of the potentiometer 338 associated with the channel 8 portion.

An up/down switch 608 is used to remotely control the height of the screed 478 above the conveyor belt 466 through suitable control of the hydraulic circuits 476 used to drive the piston 474 within the housing 472. The switch 608 provides continuous control so that the screed can be moved to any selectable height, which height is displayed in the display 238 of channel 8. The switch 608 is effective when a switch 610 is placed in the manual mode position as is illustrated in FIG. 5. When the switch 610 is placed in an automatic mode position, a switch 612 is operational to discretely move the screed to a preset height as selected by the setting at which the switch 612 is placed.

The foregoing elements of the present invention are of types as known to the art of readily comprehendable to those having skill in the art, such as suitable switches and servomechanisms electrically interconnected to effect actuation of a valve or control of a motor, for example.

The foregoing describes an integrated control system which is specifically adapted in the preferred embodiment for controlling, from a common location provided by the control house 32, the production of a fracturing fluid and the pumping of that fluid into an offshore well. More generally, there is provided an improved proppant control system for remotely controlling the transfer of proppant into a blender. Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts and in the performance of steps can be made by those skilled in the art, which changes are encompassed within the spirit of this invention as defined by the appended claims.

What is claimed is:

1. A proppant control system, comprising:
storage bin means for storing particulate material;
surge bin means for receiving a flow of the particulate material from said storage bin means;
first conveyor means for providing a flow of particulate material to said surge bin means from said storage bin means;
second conveyor means for transferring a controllable quantity of the particulate material from said surge bin means; and
proppant control means including:
first speed control means for remotely controlling the speed of said first conveyor means; and
second speed control means for remotely controlling the speed of said second conveyor means.

2. A system as defined in claim 1, wherein:
said first conveyor means includes:
trunk conveyor means for moving particulate material directly into said surge bin means; and
branch conveyor means for moving particulate material from said storage bin means to said trunk conveyor means; and
said first speed control means includes variable means for selectably controlling the speed of said branch conveyor means in response to said second speed control means.

3. A system as defined in claim 1, wherein:
said storage bin means includes:
a first bin;
a second bin; and
conduit means for providing a flow path between said first bin and said second bin; and
said proppant control means further includes pneumatic means for pneumatically transferring particulate material from said first bin to said second bin.

4. A system as defined in claim 1, wherein:
said second conveyor means includes gate means for defining an area through which the particulate material moves from said surge bin means; and
said proppant control means further includes gate control means for remotely setting the height of said gate means so that said area is remotely adjustable.

5. A system as defined in claim 1, wherein:
said system further comprises transport means for transporting said storage bin means, said surge bin means, said first conveyor means, said second conveyor means, and said proppant control means mounted thereon;
said storage bin means includes:
a first container;
a second container; and
means for communicating said first container with said second container;
said first conveyor means includes:
trunk conveyor means for moving particulate material into said surge bin means; and
branch conveyor means, disposed in communication with said second container, for moving particulate material from said second container to said trunk conveyor means;
said second conveyor means include gate means for defining an area through which the particulate material moves from said surge bin means;
said proppant control means further includes:
means for moving particulate material through said communicating means from said first container to said second container; and
gate control means for remotely setting the height of said gate means so that said area is remotely adjustable; and
said first speed control means includes variable means for selectably controlling the speed of said branch conveyor means.

* * * * *

UNITED STATES PATENT AND TRADEMARK OFFICE
CERTIFICATE OF CORRECTION

PATENT NO. : 4,850,750

DATED : July 25, 1989

INVENTOR(S) : Randall B. Cogbill et al

It is certified that error appears in the above-identified patent and that said Letters Patent is hereby corrected as shown below:

In Column 6, line 8, the word "derives" should read --drives--.

In Column 9, Line 18, the second use of the word "of" (after substances) should read --or--.

In Column 12, Line 23, the number "238" should read --328--.

In Column 14, Line 18, the word "include" should read --includes--.

Signed and Sealed this

Nineteenth Day of May, 1992

*Attest:*

DOUGLAS B. COMER

*Attesting Officer*

*Acting Commissioner of Patents and Trademarks*